(12) United States Patent
Suzuki

(10) Patent No.: US 6,930,803 B1
(45) Date of Patent: Aug. 16, 2005

(54) INFORMATION PROCESSING APPARATUS AND PROCESSING METHOD THEREFOR

(75) Inventor: Takashi Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1056 days.

(21) Appl. No.: 09/712,268

(22) Filed: Nov. 15, 2000

(30) Foreign Application Priority Data

Nov. 15, 1999  (JP) ................................. 11-324147
Jan. 31, 2000  (JP) ............................. 2000-022286

(51) Int. Cl.$^7$ ............................................. H04N 1/04
(52) U.S. Cl. ...................... 358/471; 358/474; 358/448; 358/426.04; 382/100; 382/306
(58) Field of Search ............................... 358/471, 474, 358/448, 426.04; 382/106, 135, 232, 306, 382/100; 283/74, 72; 713/176; 399/366

(56) References Cited

U.S. PATENT DOCUMENTS

| | | | |
|---|---|---|---|
| 5,583,614 A * | 12/1996 | Hasuo et al. ................... 399/4 |
| 5,982,956 A * | 11/1999 | Lahmi .......................... 382/306 |
| 6,243,480 B1 * | 6/2001 | Zhao et al. .................. 382/100 |
| 6,345,104 B1 * | 2/2002 | Rhoads ........................ 382/100 |
| 6,754,822 B1 * | 6/2004 | Zhao .......................... 713/176 |

FOREIGN PATENT DOCUMENTS

| | | |
|---|---|---|
| EP | 0 854 633 | 7/1998 |
| EP | 0 884 669 | 12/1998 |
| EP | 0 951 175 | 10/1999 |
| EP | 1 043 883 | 10/2000 |
| JP | 4-302268 | 10/1992 |
| JP | 8-50434 | 2/1996 |
| JP | 10-285381 | 10/1998 |
| WO | WO 96/31049 | 10/1996 |

* cited by examiner

Primary Examiner—Edward Coles
Assistant Examiner—Heather D. Gibbs
(74) Attorney, Agent, or Firm—Fitzpatrick, Cella, Harper & Scinto

(57) ABSTRACT

In an image processing apparatus which has an operating system (102) and scanner driver (103), is connected to a scanner (104) for reading an original and converting it into an image signal, and stores image data read by manipulating the scanner (104), a forgery determination processing module (103-2) of the scanner driver (103) compares the read digital watermark data with specific image data to determine the matching degree, and an anti-forgery control module (106) controls predetermined image processing on the basis of the determination result for the image data read by the scanner driver (103).

15 Claims, 22 Drawing Sheets

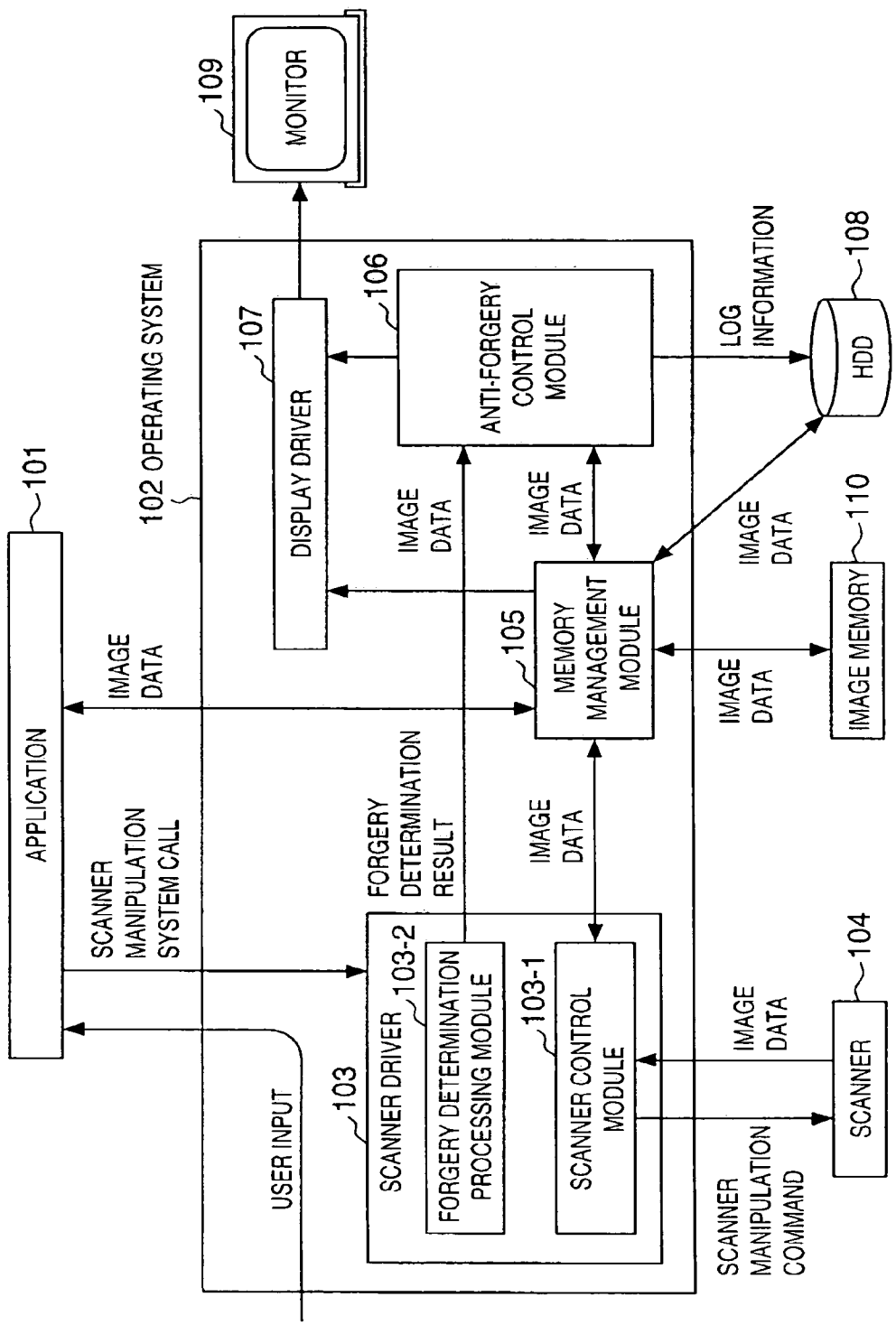

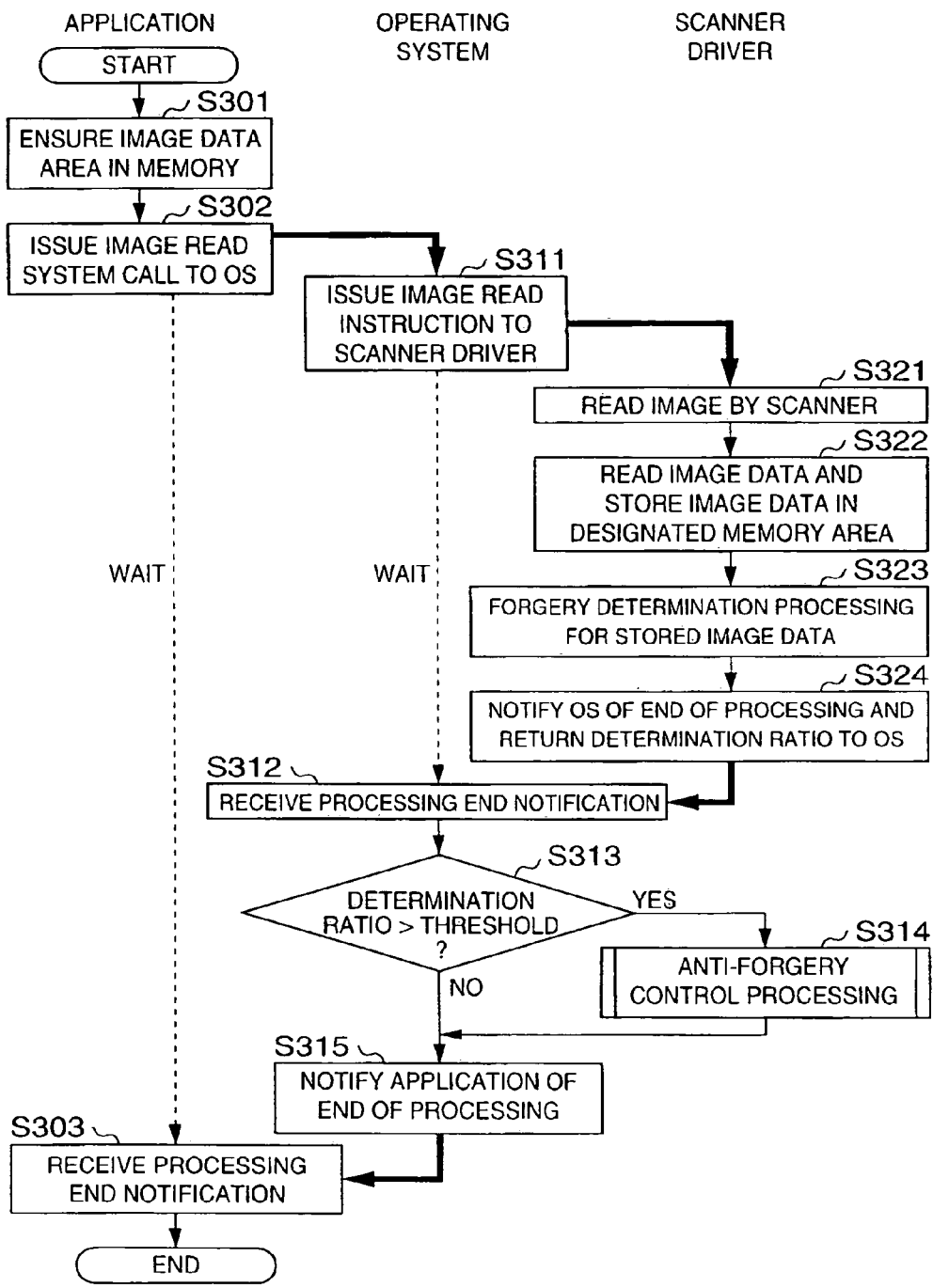

ORIGINAL IMAGE

PROCESSED IMAGE

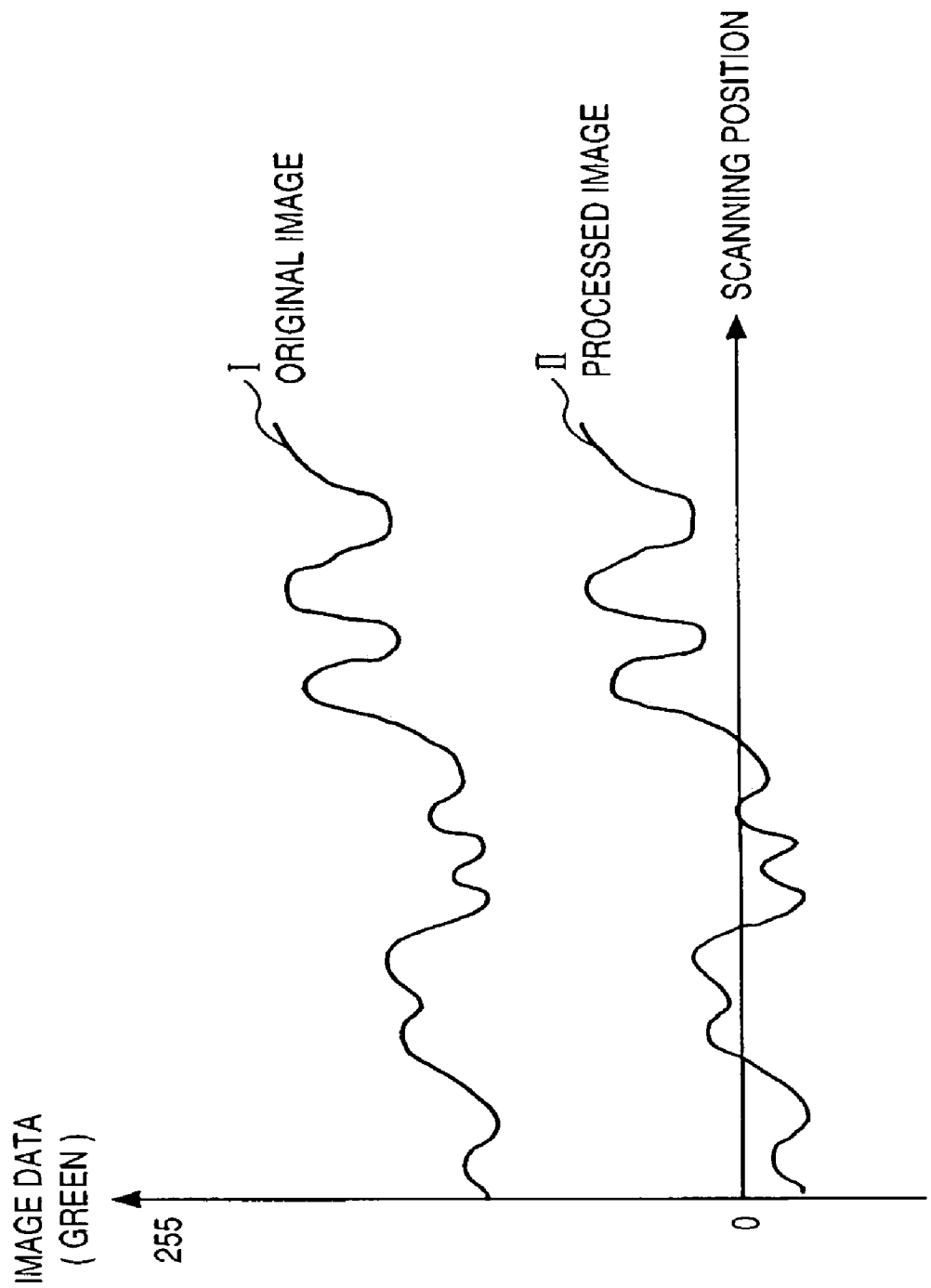

FIG. 7

LOG INFORMATION

| | |
|---|---|
| TIME : | 1999/11/15/10 : 00 |

HOST COMPUTER INFORMATION :
· MANUFACTURER NAME
· HOST ID
· OS VERSION

| | |
|---|---|
| IMAGE SIZE : | 2500x800 |
| DETERMINATION RATIO : | 95% |

FIG. 14

STORAGE MEDIUM SUCH AS FD/CD-ROM

| DIRECTORY INFORMATION |
|---|
| FIRST DATA PROCESSING PROGRAM<br>PROGRAM CODES CORRESPONDING TO STEPS OF<br>FLOW CHART SHOWN IN FIG. 3 |
| SECOND DATA PROCESSING PROGRAM<br>PROGRAM CODES CORRESPONDING TO STEPS OF<br>FLOW CHART SHOWN IN FIG. 8 |
| |

MEMORY MAP OF STORAGE MEDIUM

FIG. 19

DIGITAL WATERMARK
EXTRACTION RESULT 2001.02.01
AT Mt. FUJI

FIG. 22

STORAGE MEDIUM SUCH AS FD/CD-ROM

DIRECTORY INFORMATION

FIRST DATA PROCESSING PROGRAM
PROGRAM CODES CORRESPONDING TO STEPS OF
FLOW CHART SHOWN IN FIG. 16

MEMORY MAP OF STORAGE MEDIUM

INFORMATION PROCESSING APPARATUS AND PROCESSING METHOD THEREFOR

FIELD OF THE INVENTION

The present invention relates to an information processing apparatus in which an operating system can control read operation of an original image by a scanner via a scanner driver, or an information processing apparatus in which an operating system can control printing operation of image data by a printer via a printer driver, and a processing method therefor.

BACKGROUND OF THE INVENTION

In recent years, color image reading apparatuses (to be referred to as color scanners hereinafter) using CCDs or the like as photoelectric conversion elements, and color printers have been improved in performance. This increases the risk of copying and forging copying-prohibited originals such as bank notes or securities by reading copying-prohibited originals such as bank notes or securities as image data by a color image reading apparatus and outputting them to a color printer. To prevent the forgery, a color copying machine as a combination of a color scanner and color printer often incorporates an anti-forgery apparatus which detects a copying-prohibited original to prohibit its copying.

In addition, a so-called digital watermark technique of embedding information in an image so as not to recognize it with a naked eye is put into practice.

SUMMARY OF THE INVENTION

However, an anti-forgery apparatus used in a color copying machine operates only in copying operation. If a copying-prohibited original is independently read once by a color scanner, the image of the copying-prohibited original can undesirably be output by the color copying machine or another color printer via a controller. Forgery processing by a system, e.g., scanner system or information processing apparatus capable of outputting image data to the color printer via a host computer cannot be effectively limited between the color scanner and the color printer. A serious problem of easily forging copying-prohibited originals arises.

Furthermore, there is no information processing apparatus for outputting embedded information so as to easily recognize it.

The present invention has been made to overcome the conventional drawbacks, and has as its object to provide an information processing apparatus capable of allowing an operating system to control read operation of an original image by a scanner via a scanner driver, wherein image data read by the scanner driver is compared with specific image data to determine the matching degree, predetermined image processing for the image data read by the scanner driver is controlled on the basis of the determination result, and thus even in an environment in which the scanner is not constituted as a copying system integrated with a printer and can perform image read processing by the scanner itself, when image data which matches a specific image whose copying operation is prohibited is read, the read illicit image data which matches the specific image is processed into insignificant image data, thereby reliably preventing image input processing of creating a forgery from a copying-prohibited original, an information processing apparatus capable of allowing an operating system to control printing operation of image data by a printer via a printer driver, wherein image data rasterized by the printer driver is compared with specific image data to determine the matching degree, predetermined image processing for the image data rasterized by the printer driver is controlled on the basis of the determination result, and thus even in an environment in which the printer is not constituted as a copying system integrated with a scanner and can perform image output processing by the printer itself, when image data which matches a specific image whose copying operation is prohibited is rasterized, the rasterized illicit image data which matches the specific image is processed into insignificant image data, thereby reliably preventing image output processing of creating a forgery from a copying-prohibited original, and a processing method therefor.

The present invention has been made to overcome the conventional drawbacks, and has as its object to provide an information processing apparatus capable of extracting information embedded in an image, processing the extracted information into an image, and outputting the image, and a processing method therefor.

According to the first aspect of the present invention, an information processing apparatus capable of controlling read operation of an original image by a scanner (scanner 104 shown in FIG. 2) via a scanner driver (corresponding to a scanner driver 103 shown in FIG. 2) comprises determination means (corresponding to a forgery determination processing module 103-2 shown in FIG. 2) for determining by the scanner driver whether digital watermark information is embedded in image data read by the scanner, and control means (corresponding to an anti-forgery control module 106 shown in FIG. 2) for controlling predetermined image processing for the read data on the basis of a determination result by the determination means.

According to the second aspect of the present invention, the control means processes the read image data into image data different from the read image data when the determination means determines that the image data substantially matches the specific image data.

The third aspect of the present invention further comprises display means (monitor 109 shown in FIG. 2) for displaying a warning message representing that the image data is processed to match the specific image data when the control means performs the predetermined image processing for the image data, and the control means discards the read and processed image data on the basis of an image processing request from a user in response to the warning message displayed on the display means.

According to the fourth aspect of the present invention, the predetermined image processing includes resolution conversion processing of converting a resolution of the read image data, color conversion processing of converting color tone of the read image data, and image conversion processing of adding arbitrary image data to the read image data.

According to the fifth aspect of the present invention, the control means creates log information from which a read processing status of the specific image data can be verified, and registers the log information in a nonvolatile memory on the basis of the image processing request from the user in response to the warning message displayed on the display means.

According to the sixth and 18th aspects of the present invention, the specific image data includes an original image whose copying operation is prohibited by law.

According to the seventh and 19th aspects of the present invention, the specific image data is stored and managed in advance so as to be updateable.

According to the eighth aspect of the present invention, the scanner can be connected via a local interface or a network interface.

According to the ninth aspect of the present invention, the digital watermark information is embedded in the specific image data at a predetermined cycle.

According to the 10th aspect of the present invention, the digital watermark information includes, as code information, information about the type of specific image data, an issue country, an issue number, and a value.

According to the 11th aspect of the present invention, the digital watermark information includes invisible or visible information.

The 12th aspect of the present invention further comprises storage means for storing image data read by the scanner, and the control means also processes an image stored in the storage means.

According to the 13th aspect of the present invention, an image processing method for an information processing apparatus capable of controlling read operation of an original image by a scanner (scanner 104 shown in FIG. 2) via a scanner driver (corresponding to the scanner driver 103 shown in FIG. 2) comprises the determination step of determining by the scanner driver whether digital watermark information is embedded in image data read by the scanner, and the control step of controlling predetermined image processing for the read image data on the basis of a determination result in the determination step.

According to the 14th aspect of the present invention, the control step (step S601 shown in FIG. 8) comprises processing the read image data into image data different from the read image data when the image data is determined in the determination step to substantially match the specific image data.

The 15th aspect of the present invention further comprises the display step (step S602 shown in FIG. 8) of displaying a warning message representing that the image data is processed to match the specific image data when the predetermined image processing is performed for the image data in the control step, and the control step comprises discarding (step S604 shown in FIG. 8) the read and processed image data on the basis of an image processing request from a user in response to the warning message displayed in the display step.

According to the 16th aspect of the present invention, the predetermined image processing includes resolution conversion processing of converting a resolution of the read image data, color conversion processing of converting color tone of the read image data, and image conversion processing of adding arbitrary image data to the read image data.

According to the 17th aspect of the present invention, the control step comprises creating log information from which a read processing status of the specific image data can be verified, and registering the log information in a nonvolatile memory (corresponding to a hard disk 108 shown in FIG. 2) on the basis of the image processing request from the user in response to the warning message displayed in the display step.

According to the 20th aspect of the present invention, a recording medium stores in a computer-readable manner a program for causing an information processing apparatus capable of controlling read operation of an original image by a scanner (scanner 104 shown in FIG. 2) via a scanner driver (corresponding to the scanner driver 103 shown in FIG. 2), to execute the determination step of determining by the scanner driver whether digital watermark information is embedded in image data read by the scanner, and the control step of controlling predetermined image processing for the read image data on the basis of a determination result in the determination step.

According to the 21st aspect of the present invention, the control step (step S601 shown in FIG. 8) comprises processing the read image data into image data different from the read image data when the image data is determined in the determination step to substantially match the specific image data.

According to the 22nd aspect of the present invention, the recording medium records in a computer-readable manner a program for causing the information processing apparatus to execute the display step (step S602 shown in FIG. 8) of displaying a warning message representing that the image data is processed to match the specific image data when the predetermined image processing is performed for the image data in the control step, and the control step comprises discarding (step S604 shown in FIG. 8) the read and processed image data on the basis of an image processing request from a user in response to the warning message displayed in the display step.

According to the 23rd aspect of the present invention, the predetermined image processing includes resolution conversion processing of converting a resolution of the read image data, color conversion processing of converting color tone of the read image data, and image conversion processing of adding arbitrary image data to the read image data.

According to the 24th aspect of the present invention, the control step comprises creating log information from which a read processing status of the specific image data can be verified, and registering the log information in a nonvolatile memory (corresponding to the hard disk 108 shown in FIG. 2) on the basis of the image processing request from the user with respect to the warning message displayed in the display step.

According to the 25th aspect of the present invention, an information processing apparatus capable of controlling read operation of an original image by a scanner (scanner 104 shown in FIG. 15) via a scanner driver (corresponding to the scanner driver 103 shown in FIG. 15) comprises information extraction means (corresponding to a digital watermark extraction module 103-3 shown in FIG. 15) for extracting, by the scanner driver, digital watermark information embedded in image data read by the scanner, and image processing means (corresponding to an image processing control module 116 shown in FIG. 15) for processing the image data on the basis of an extraction result from said information extraction means.

The 26th aspect of the present invention further comprises selection means (corresponding to a monitor 109 shown in FIG. 15) for causing a user to select whether to process the image data by the image processing means.

According to the 27th aspect of the present invention, the selection means displays whether to process the image data on display means, thereby causing the user to select whether to process the image data.

According to the 28th aspect of the present invention, the image processing means overlays the information extracted by the information extraction means on the image data According to the 29th aspect of the present invention, a processing method for an information processing apparatus capable of controlling read operation of an original image by a scanner via a scanner driver comprises an information extraction step (step S423 shown in FIG. 16) of extracting, by the scanner driver, digital watermark information embedded in image data read by the scanner, and an image processing step (step S413 shown in FIG. 16) of processing the image data on the basis of an extraction result in the information extraction step.

According to the 30th aspect of the present invention, a recording medium stores in a computer-readable manner a program for causing an information processing apparatus capable of controlling read operation of an original image by a scanner via a scanner driver, to execute an information extraction step of extracting, by the scanner driver, digital watermark information embedded in image data read by the scanner, and an image processing step of processing the input image data on the basis of an extraction result.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram for explaining the internal structure of the OS in the host computer 21 shown in FIG. 1;

FIG. 3 is a flow chart showing an example of the first data processing sequence in the information processing apparatus according to the present invention;

FIG. 5 is a graph showing an example of image data processing by the operating system shown in FIG. 2;

FIG. 7 is a view showing an example of log information stored in a hard disk shown in FIG. 2;

FIG. 14 is a view for explaining the memory map of a storage medium which stores various data processing programs readable by the information processing apparatus according to the present invention;

FIG. 19 is a view showing an example of log information stored in a hard disk 108;

FIG. 22 is a view for explaining the memory map of a storage medium which stores various data processing programs readable by the information processing apparatus according to the present invention.

DETAILED DESCRIPTION OF THE PREFERRED EMBODIMENTS

First Embodiment

Figure 1:
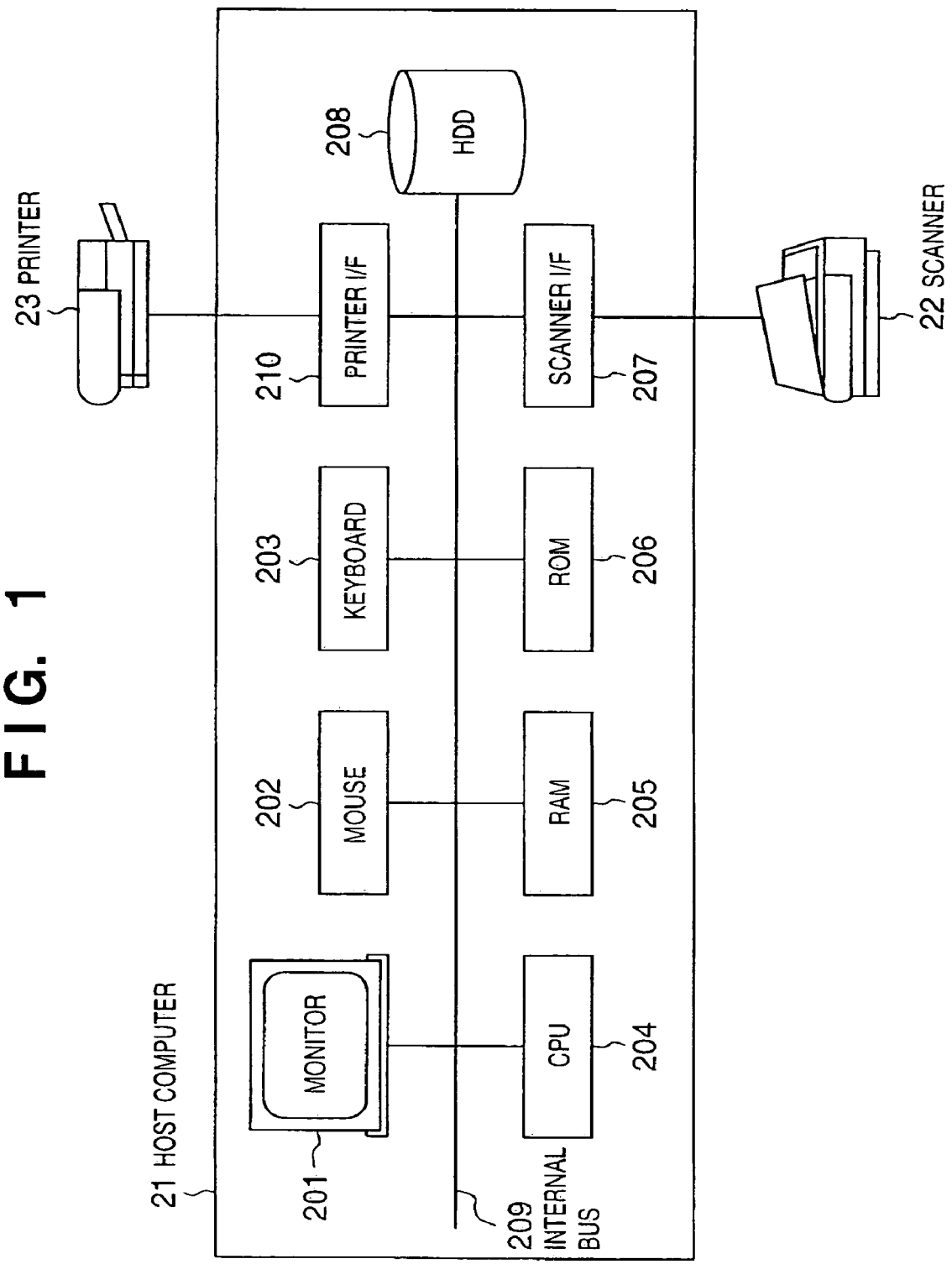
FIG. 1 is a block diagram showing an example of an image processing system to which an information processing apparatus according to the first embodiment of the present invention can be applied.

FIG. 1 is a block diagram showing an example of an image processing system to which an information processing apparatus according to the first embodiment of the present invention can be applied. As shown in FIG. 1, this system is built by a printer 23 and scanner 22, including a host computer (information processing apparatus) 21. This system may be built as a scanner system by the host computer 21 and scanner 22, or as a printer system by the host computer 21 and printer 23. Alternatively, the system may be built by only either of the systems. The system may use a plurality of scanners or printers. The present invention can be applied to any connection form regardless of a network or local connection.

An operating system (to be referred to as an "OS" hereinafter) 102 shown in FIG. 2 runs on the host computer 21. A scanner manipulation application (application) 101 running on the OS provides a manipulation environment for, e.g., image read operation of a scanner 104 (corresponding to the scanner 22 shown in FIG. 1).

In FIG. 1, the host computer 21 as a scanner system comprises a monitor 201 for displaying the GUI of the application 101 or an image read result from the scanner 22, a mouse 202 for transferring a user input to the application and OS, a keyboard 203, an HDD 208 for storing various programs and image data, a ROM 206 for storing the basic programs of the host computer 21, a RAM 205 for reading a program and storing an image, and a scanner I/F 207 for controlling the scanner 22. The monitor 201, mouse 202, keyboard 203, HDD 208, ROM 206, RAM 205, and scanner I/F 207 are connected to each other via an internal bus 209, and controlled by a CPU 204.

The host computer 21 as a printer system comprises the monitor 201 for displaying the GUI of an application 701 (to be described later) shown in FIG. 9 or an image to be output to the printer 23; the mouse 202 for transferring a user input to the application and OS, the keyboard 203, the HDD 208 for storing various programs and image data, the ROM 206 for storing the basic programs of the host computer 21, the RAM 205 for loading a program and storing an image, and a printer I/F 210 for controlling the printer 23. The monitor 201, mouse 202, keyboard 203, HDD 208, ROM 206, RAM 205, and printer I/F 210 are connected to each other via the internal bus 209, and controlled by the CPU 204.

Both the OS and application are realized on the host computer 21 having this arrangement by running by the CPU 204 a program loaded from the HDD 208 to the RAM 205.

The internal structure of the OS will be explained within a range necessary for this system.

FIG. 2 is a block diagram for explaining the internal structure of the OS in the host computer 21 shown in FIG. 1. Note that most of OSs such as UNIX isolatedly mount a device driver which interfaces with hardware such as a scanner, and various modules for performing management of other user applications, memory management, and the like. In this embodiment, an OS having this isolation structure will be exemplified. In FIG. 2, the OS 102 has a scanner driver 103 as a module for controlling a user input and another hardware device, and in addition controlling the scanner 104. The scanner driver 103 in the first embodiment comprises a scanner control module 103-1 for directly controlling the scanner 104 and a forgery determination processing module 103-2 for determining whether an image received from the scanner 104 is an copying-prohibited original.

The OS 102 has a memory management module 105 for managing the image data area of an image memory 110 which stores image data received from the scanner 104. The image memory 110 is part of the RAM 205 shown in FIG. 1.

The application 101 is made up of a GUI routine for interfacing with the user, a routine for interpreting a user input received via the OS 102 and issuing an instruction for operating the scanner 104, a routine for displaying image data read from the scanner 104, and a routine for saving read image data in an HDD 108.

The scanner 104 scans an original placed on a table with a CCD line sensor (not shown) in accordance with a scanner manipulation signal from the scanner driver 103 to optically read the original, converts the image data into an electrical signal (photoelectric conversion), and returns the image signal to the host computer 21 (more specifically, the scanner control module 103-1 of the scanner driver 103) in accordance with a predetermined interface rule.

The image signal is comprised of a plurality of color components, e.g., R, G, and B, and each color component is multilevel data of 8 to 12 bits.

The data processing sequence of the scanner system shown in FIG. 2 will be explained on the basis of a flow chart shown in FIG. 3.

FIG. 3 is a flow chart showing an example of the first data processing sequence in the information processing apparatus according to the present invention. This data processing sequence corresponds to a data processing sequence between the modules of the application 101, OS 102, and scanner driver 103 shown in FIG. 2. S301 to S303 shown in FIG. 3 correspond to the steps of the application 101; S311 to S315, to the steps of the operating system 102; and S321 to S324, to the steps of the scanner driver 103.

When the user instructs scanning start operation via the GUI of the application 101, the application 101 advances to step S301. Before read operation starts, the application 101 ensures in the image memory 110 (RAM 205) the area of an image to be read that is designated by the user. Note that the image area on the image memory 110 is ensured by the memory management module 105. In step S302, the application 101 specifies the scanner 104 to be used to the OS 102, issues an image read instruction, and enters a wait state and stays there until the application 101 receives an image read processing end notification in step S303.

The OS 102 which has received the scanning start instruction shifts to step S311, and invokes the scanner driver 103 corresponding to the specified scanner (in the first embodiment, the local-connected scanner 104) to issue an image read instruction to the scanner driver 103. The OS 102 enters a wait state and stays there until the OS 102 receives a processing end notification from the scanner driver 103 in step S312. At this time, the OS 102 prepares as a variable a determination ratio representing whether image data is a copying-prohibited original so that the forgery determination processing module 103-2 determines the determination ratio.

The scanner control module 103-1 in the scanner driver 103 that has received the image read start instruction from the OS 102 advances to step S321, and issues a scanning start instruction unique to the scanner to the scanner 104 to start image read by the scanner 104. In step S322, the scanner control module 103-1 receives an image signal of an original image read by the scanner 104, stores the image signal in the image area in the image memory 110 (RAM 205) ensured by the application 101, and shifts processing to the forgery determination processing module 103-2 in the scanner driver 103.

Note that the forgery determination processing module 103-2 has a copying-prohibited pattern as a template in a memory (RAM or ROM) arranged separately from the image memory 110.

In step S323, the forgery determination processing module-103-2 executes pattern matching between the template and the image data stored in the image memory 110 (RAM 205), and outputs the matching result as a determination ratio having a value from "0" to "100". As an example of this pattern matching, the correlation between the image data and the template is calculated for each color component to output a maximum value. However, the pattern matching method in the first embodiment is not particularly limited.

A plurality of copying-prohibited pattern templates may be prepared. In this case, the forgery determination processing module 103-2 performs pattern matching between a plurality of patterns and image data, and outputs a maximum value.

The first embodiment has described the forgery determination processing module 103-2 as a software module. However, the forgery determination processing module 103-2 is not limited to this, and can be realized as hardware processing constituted by, e.g., a high-speed RISC and ASIC to increase the speed.

After the image data is read and subjected to forgery determination processing, the scanner driver 103 notifies in step S324 the OS 102 of the end of read processing, and at the same time returns the determination ratio as a result of pattern matching with the copying-prohibited pattern.

If the OS 102 receives the processing end notification from the scanner driver 103 in step S312, the OS 102 shifts to step S313, and checks whether the image data is a copying-prohibited image, on the basis of the result (determination ratio) of actually performing forgery determination processing by the forgery determination processing module 103-2. If the determination ratio is higher than a threshold set in advance on the OS 102 side, the OS 102 determines that the image data read by the scanner 104 may be a copying-prohibited image at a high possibility. Then, the OS 102 advances to step S314 to perform anti-forgery control processing (to be described in later).

If the determination ratio is determined in step S313 to be lower than the pre-set threshold, or anti-forgery control processing ends, the OS 102 shifts to step S315, and issues a processing end notification to the application 101 to end image read operation of the scanner system.

Figure 4A:
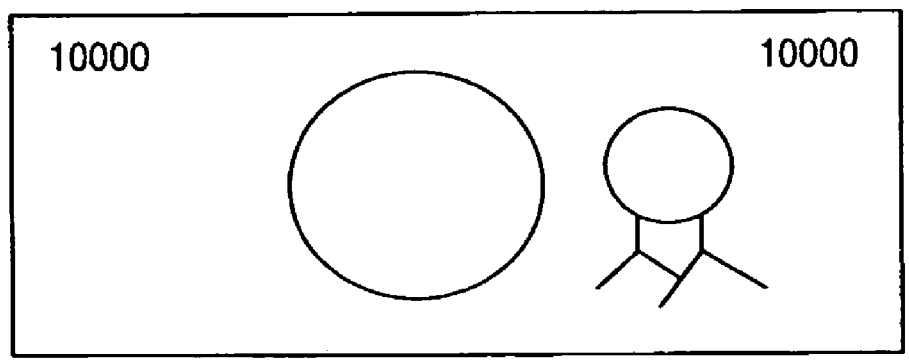
FIGS. 4A and 4B are views showing an example of anti-forgery processing by an operating system shown in FIG. 2.
Figure 4B:
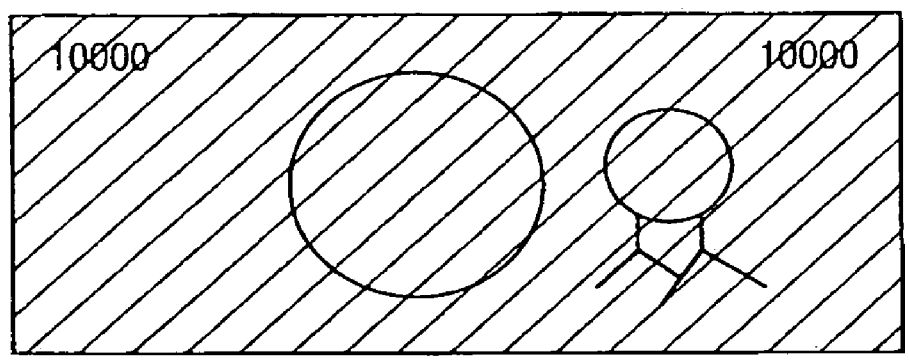

FIGS. 4A and 4B are views showing an example of anti-forgery processing by the operating system 102 shown in FIG. 2, and corresponds to an anti-forgery processing state to a bank note whose copying operation is prohibited.

FIG. 4A represents an original image read by the scanner 104, and FIG. 4B represents a processed image.

FIG. 5 is a graph showing an example of image data processing by the operating system 102 shown in FIG. 2. The ordinate represents image data (Green), and the abscissa represents the scanning position. I in FIG. 5 indicates original image data, and II indicates processed image data.

FIG. 5 shows Green data at part of an image along the ordinate, and the main scanning position of the image along the abscissa. The ordinate represents that image data has 256 gray levels from "0" to "255". As image data is nearer "255", the image is bright. Image data I means original image data before processing. By setting image data to a smaller value by a given value for all the pixels of the image data; image data II is generated. Of image data II, all data of "0" or less are "0", so that tonal information of the image is lost. This processing is executed for Red and Blue except Green to generate image FIG. 4B as an output image candidate.

The first embodiment cannot return a processed image to an image before processing. From this, an image displayed on a monitor 109 by the application 101 and an image saved in an HDD 108 are all processed images.

Figure 6:
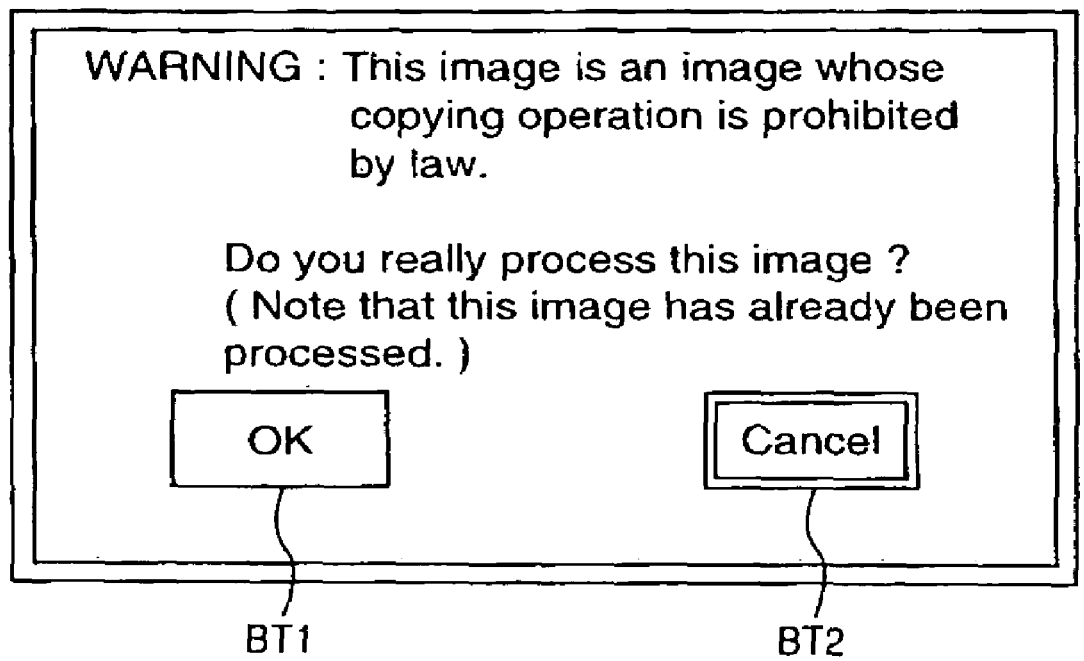
FIG. 6 is a view showing an example of a user interface window displayed on a monitor shown in FIG. 2.

FIG. 6 is a view showing an example of a user interface window displayed on the monitor 109 shown in FIG. 2, and corresponds to a warning window example displayed to the user when image data read by the scanner 104 is detected as copying-prohibited image data. In FIG. 6, BT1 is a button which is selected and clicked by the user when the user approves the contents of a displayed warning and outputs an image. BT2 is a button which is selected and clicked by the user when the user approves the contents of a displayed warning and avoids outputting an image.

FIG. 7 is a view showing an example of log information stored in the hard disk 108 shown in FIG. 2. This log information corresponds to a manipulation log of the scanner 104. In FIG. 7, the manipulation log includes the time, host computer information (manufacturer name, host ID, and OS version), image size, and determination ratio.

Anti-forgery control processing (S314) shown in FIG. 3 will be described in detail with reference to a flow chart shown in FIG. 8.

Figure 8:
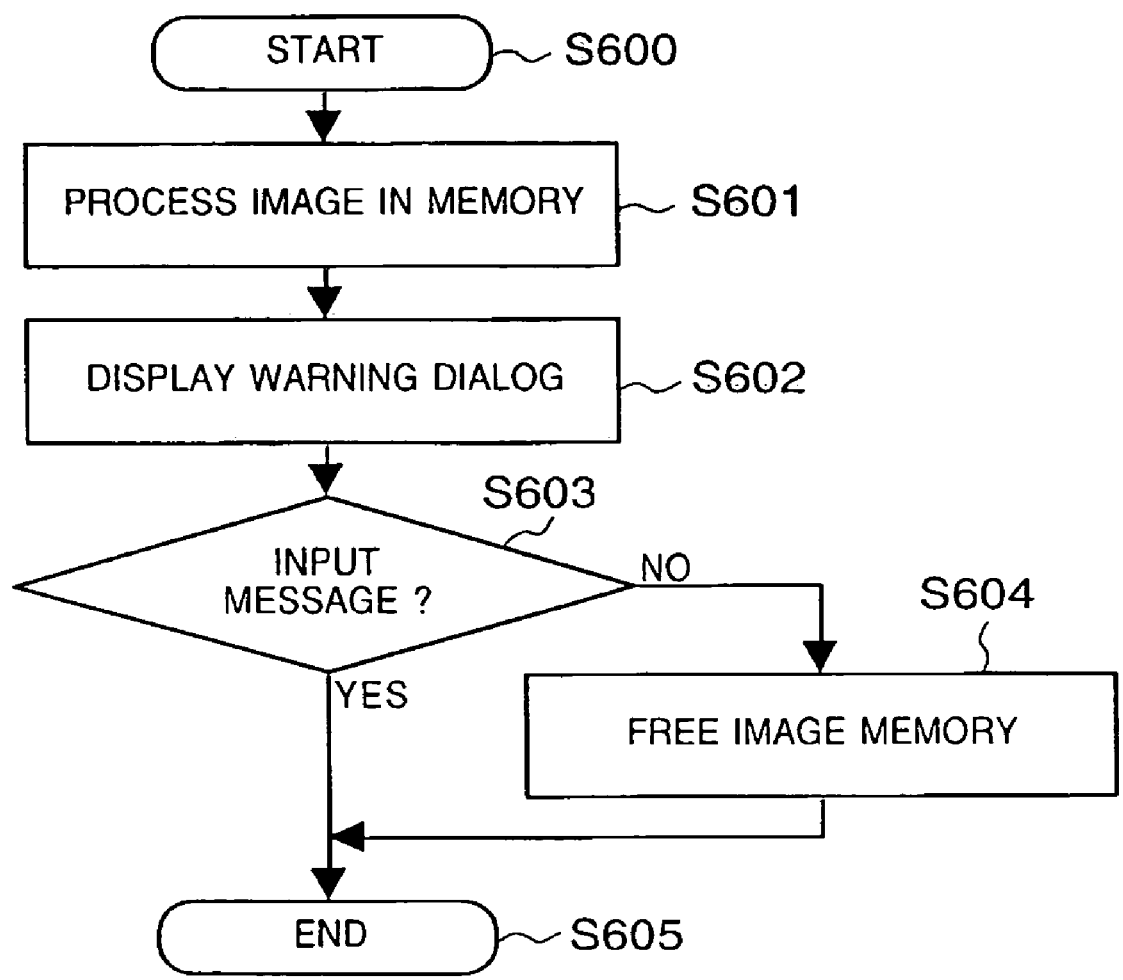
FIG. 8 is a flow chart showing an example of the second data processing sequence in the information processing apparatus according to the present invention.

FIG. 8 is a flow chart showing an example of the second data processing sequence in the information processing apparatus according to the present invention, and corresponds to the anti-forgery control processing sequence in step S314 shown in FIG. 3. Note that reference symbols S600 to S605 denote steps.

Processing starts in step S600, and an image in the image memory 110 undergoes anti-forgery image processing in step S601.

In the first embodiment, original image FIG. 4A undergoes processing to generate an image painted out with gray as processed image FIG. 4B. More specifically, as shown in FIG. 5, the processing principle is to perform image processing for original image data I and generate image data II.

Assuming that image data I is comprised of R (Red), G (Green), and B (Blue) color signals, the user input window shown in FIG. 6 is displayed on the monitor 109 via a display driver 107. Accordingly, when an image input by the scanner 104 may be a copying-prohibited original, the user is made to confirm whether to actually read the image.

In step S603, it is checked whether either of the buttons on the user input window, i.e., "OK"-corresponding to the button BT1 and "Cancel" corresponding to the button BT2 has been selected and clicked. If "OK" has been selected and clicked (if the image is to be read), a manipulation log as shown in FIG. 7 is stored in the HDD 108, and processing ends in step S605. The operation that the copying-prohibited original has been read can be left as an evidence, which facilitates confirming whether the copying-prohibited original has been input.

If "Cancel" is determined in step S603 to be selected and clicked, that is, the image is not to be read, the image memory 110 storing the image is treed, no image read is performed, and processing ends in step S605.

As described above, according to the first embodiment, the information processing apparatus, which can control read operation of an original image by the scanner via the scanner driver by the operating system, compares image data read by the scanner driver with specific image data to determine the matching degree, controls predetermined image processing for the image data read by the scanner driver on the basis of the determination result, and thus even in an environment which can perform image read processing by the scanner itself (not use a printer), when image data which matches a specific image whose copying operation is prohibited is read, processes the read illicit image data which matches the specific image into insignificant image data, thereby reliably preventing image input processing of creating a forgery from a copying-prohibited original.

Second Embodiment

The first embodiment has described a case wherein predetermined image processing is executed in a scanner system for an input image of an anti-forgery target original. The present invention is not limited to this, anti-forgery processing can be done in, e.g., a printer system as well. This embodiment will be explained.

Figure 9:
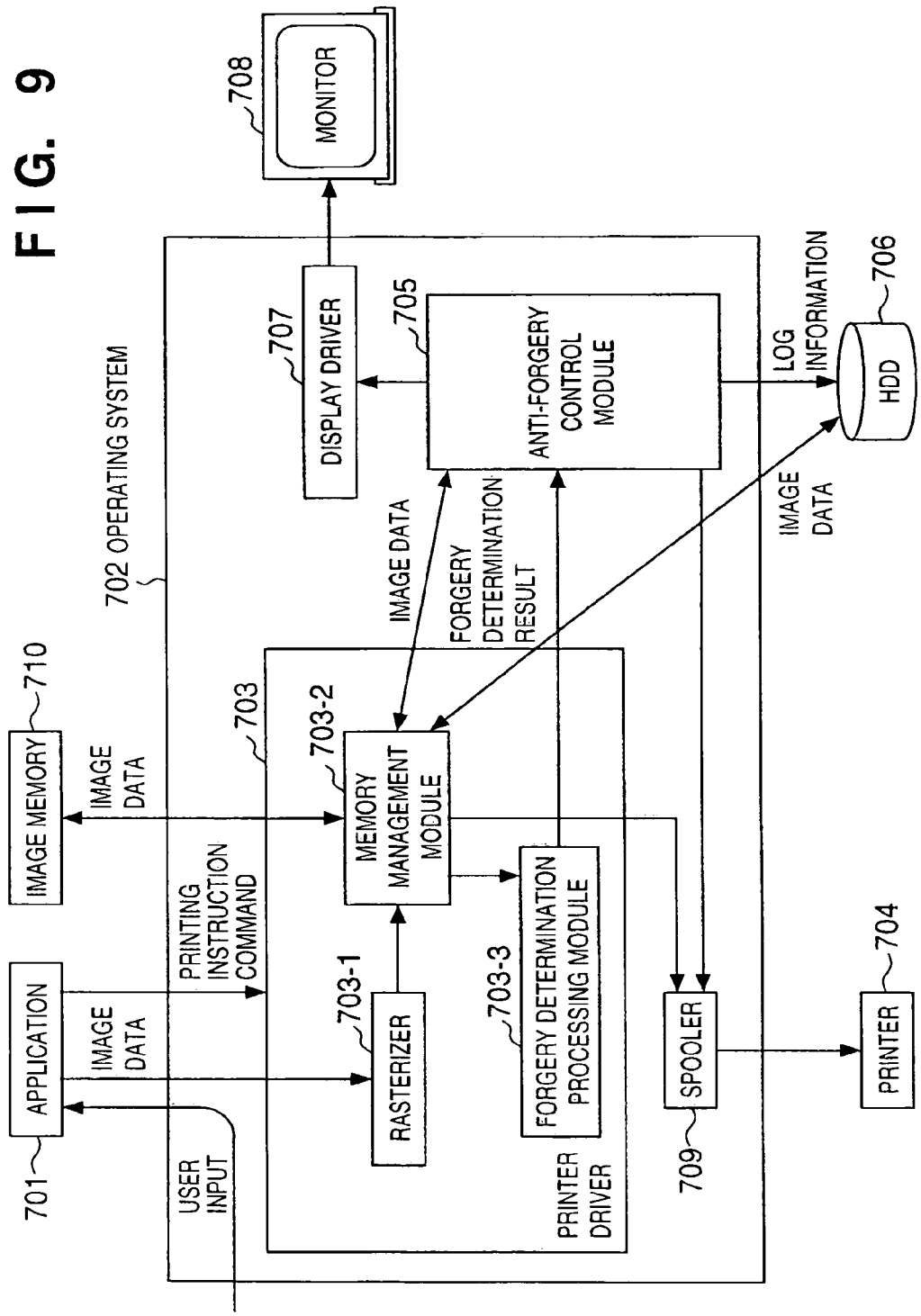
FIG. 9 is a block diagram showing an example of an information processing apparatus according to the second embodiment of the present invention.

FIG. 9 is a block diagram showing an example of an information processing apparatus according to the second embodiment of the present invention. According to the second embodiment, anti-forgery processing is performed by a printer driver 703 and OS 702 shown in FIG. 9 in an image processing system built by a host computer 21 and printer 23 shown in FIG. 1. Similar to the first embodiment, the OS 702 runs on the host computer 21, and an application 701 running on the OS 702 provides a manipulation environment for image output operation to a printer 704 (corresponding to the printer 23 shown in FIG. 1).

Similar to the scanner system shown in FIG. 2, the printer system shown in FIG. 9 is also implemented on a hardware arrangement shown in FIG. 1. This system is built by the host computer 21 and printer 23 (printer 704 in FIG. 9). Both the OS and application on the host computer 21 realize anti-forgery processing in the printer system by running by a CPU 204 a program loaded from an HDD 208 to a RAM 205. In FIG. 9, the OS 702 has a printer driver 703 as a module for controlling a user input and another hardware device, and in addition controlling the printer. The printer driver 703 comprises a rasterizer 703-1 for generating image data suitable for the printer 704, a memory management module 703-2 for managing an image memory 710 for storing the generated image data, and a forgery determination processing module 703-3 for determining whether the rasterized image is a copying-prohibited original.

A forgery determination result output from the forgery determination processing module 703-3 is transferred to an anti-forgery control module 705 which performs processing for preventing or suppressing forgery operation on the basis of the determination result.

The OS 702 has a printing spooler 709 for performing control for outputting an image rasterized by the rasterizer 703-1 in the printer driver 703 to the printer 704. In this embodiment, the rasterizer 703-1 and forgery determination processing module 703-3 are operated by the printer driver 703, i.e., by software processing, but can be operated on the printer 704 side.

In this case, the result of forgery determination processing performed on the printer 704 side is returned to the anti-forgery control module 705. The flow of anti-forgery processing in the second embodiment will be explained.

When the OS 702 which has received a printing instruction command via the GUI of the application 101 requests of the printer driver 703 printing processing of data received from the application 701, the printer driver 703 which has received the printing processing request uses the rasterizer 703-1 to rasterize a printing document as image data, and stores the image data in the image memory 710. The image data stored in this manner is transferred to the forgery determination processing module 703-3 and printing spooler 709 which start forgery determination processing and printing processing, respectively.

Similar to the first embodiment, the forgery determination processing module 703-3 determines by pattern matching whether an image to be printed contains a copying-prohibited pattern, and outputs the result as a determination ratio to the anti-forgery control module 705.

The anti-forgery control module 705 compares a threshold set in advance in the OS 702 with the determination ratio as an output value from the forgery determination processing module 703-3. When the determination ratio is higher, anti-forgery control module 705 executes image processing similar to FIGS. 4A and 4B, and displays a warning dialogue similar to the one shown in FIG. 6 on a monitor 708.

Figure 10:
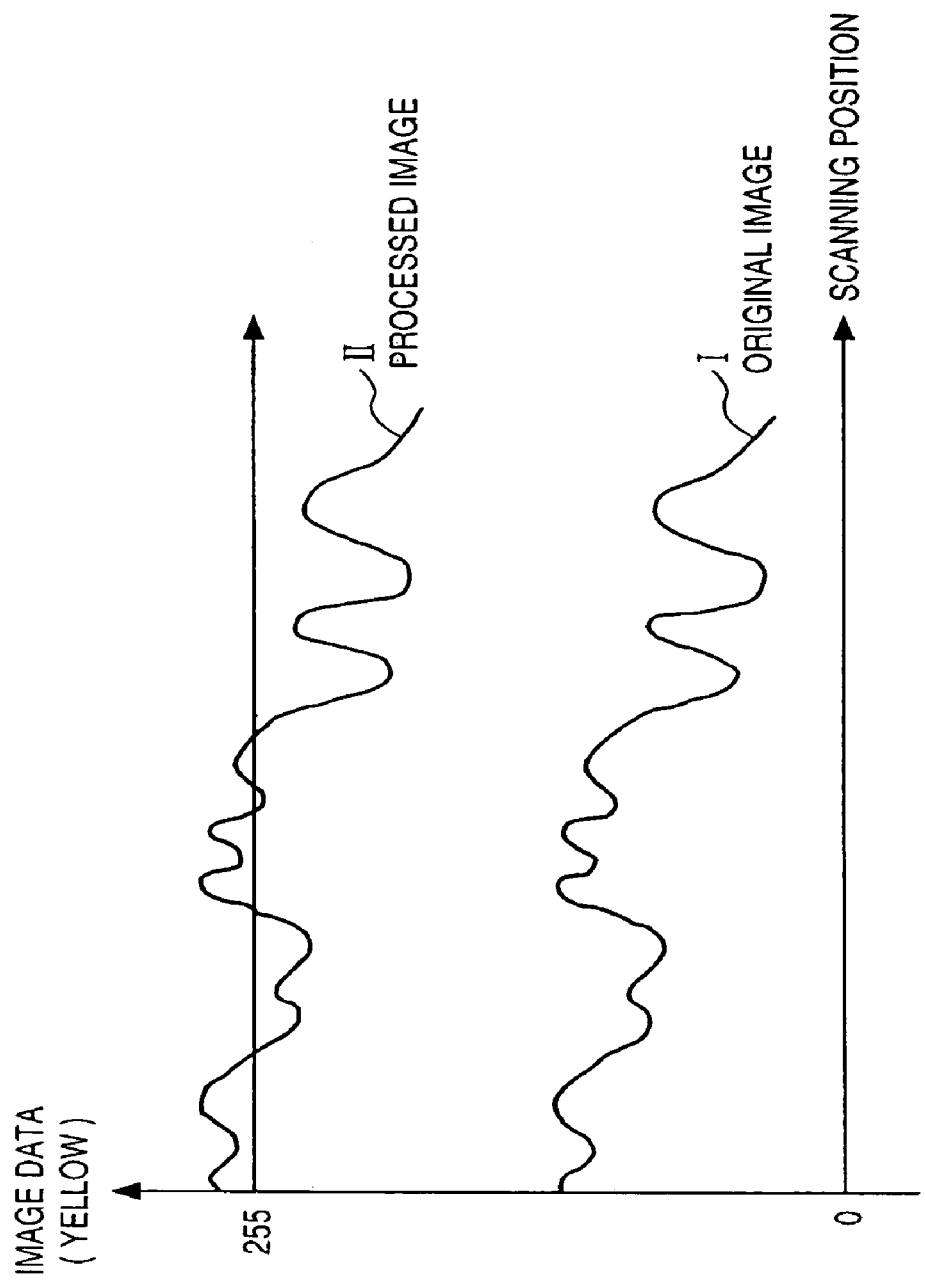
FIG. 10 is a graph showing an image processing principle for image data to be forged in the information processing apparatus according to the present invention.

FIG. 10 is a graph for explaining the image processing principle of the printer system for image data to be forged. In FIG. 10, the ordinate represents Yellow data at part of an image, and the abscissa represents the main scanning position of the image. For example, when image data is in a color space format of M (Magenta), C (Cyan), Y (Yellow), and BK (BlacK), the image data has 256 tone levels from "0" to "255". As image data is nearer "255", the image is dark.

In FIG. 10, image data I means original image data before processing. By setting image data to a larger value by a given value for all the pixels of the image data, processed image data II is generated. Of image data II, all data of "255" or more are "255", so that tonal information of the image is lost. This processing is executed for Magenta, Cyan, and Black as well as Yellow to output image in FIG. 4B.

Similar to the first embodiment, the second embodiment cannot return a processed image to an image before processing. From this, an image displayed on the monitor 708 from the application 701 or an image saved in an HDD 706 is also a processed image.

When the user determines not to perform printing on the dialogue shown in FIG. 6 (when the button BT2 is selected and clicked), a spool stop instruction is issued to the spooler 709, and printing processing ends.

To the contrary, when the user determines to perform printing on the dialogue shown in FIG. 6 (when the button BT1 is selected and clicked), manipulation log information shown in FIG. 7 is stored in the hard disk 706 to end printing processing. As a result, when image data to be printed is similar to anti-forgery target image data, the image to be printed is printed out as a processed image, and image data II shown in FIG. 10 is not output directly, i.e., as an original image.

As described above, according to the second embodiment, the information processing apparatus in which the operating system can control printing operation of image data by the printer via the printer driver compares image data rasterized by the printer driver with specific image data to determine the matching degree, controls predetermined image processing for the image data rasterized by the printer driver on the basis of the determination result, and thus even in an environment which can perform image output processing by the printer itself (not use a scanner), when image data which matches a specific image whose copying operation is prohibited is rasterized, processes the rasterized illicit image data which matches the specific image into insignificant image data, thereby reliably preventing image output processing of creating a forgery from a copying-prohibited original.

Third Embodiment

The first and second embodiments have described a case wherein the tint component of image data is processed into a tint component different from an original. However, anti-forgery image processing of the present invention is not limited to this, and may be modified to perform processing of thinning input image data to decrease the resolution, decreasing the gray levels of image data, or replacing image data stored in image data or generated with another image data and rasterizing the replaced image data.

Alternatively, processing of leaving only one color of R, G, and B, or M, C, Y, and BK and erasing images of the remaining colors may be executed. These processes may be appropriately combined. This embodiment will be explained.

Figure 11:
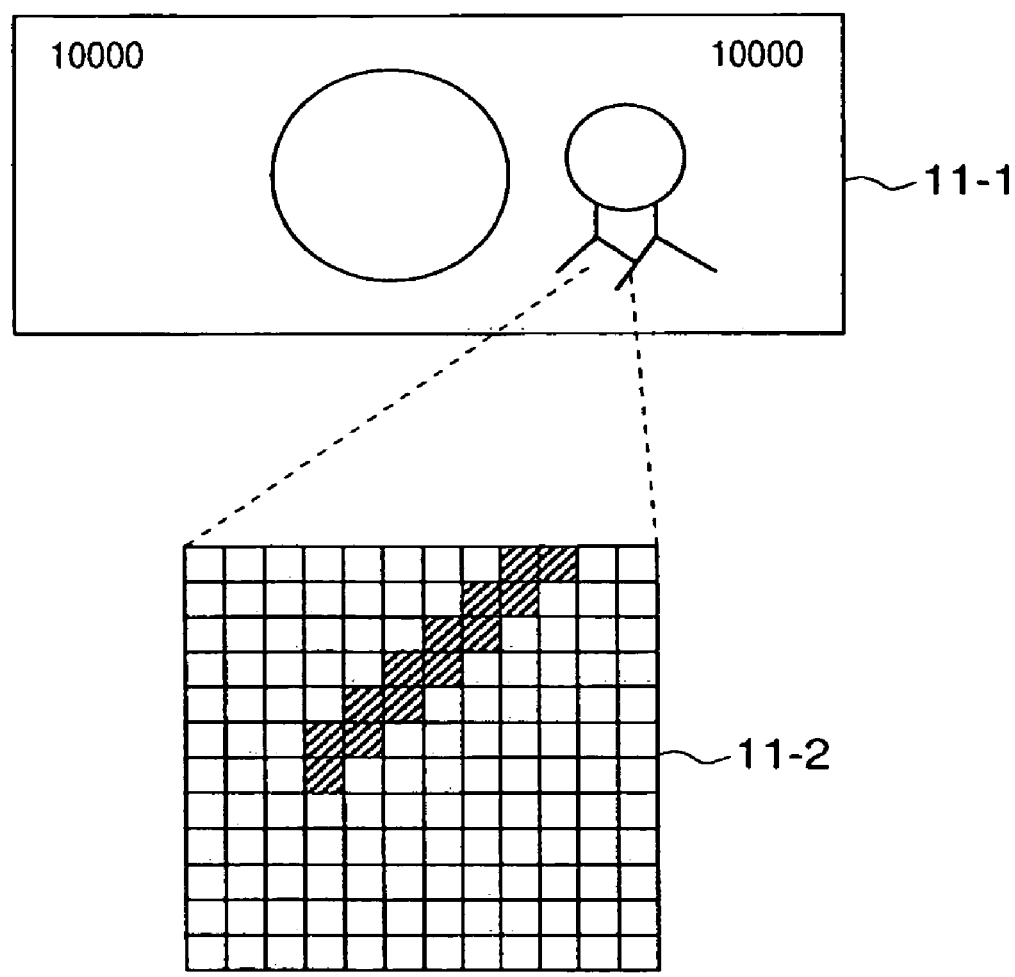
FIG. 11 is a view showing an example of image processing in an information processing apparatus according to the third embodiment of the present invention.
Figure 12:
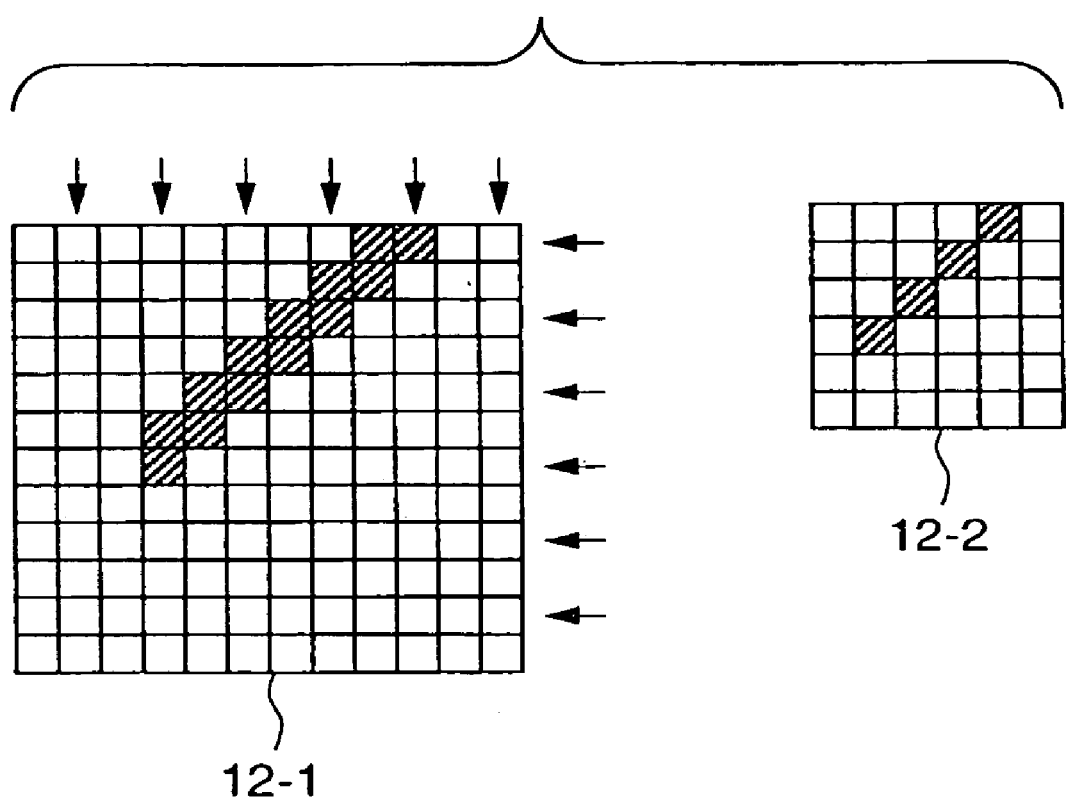
FIG. 12 is a view showing another example of image processing in the information processing apparatus according to the third embodiment of the present invention.
Figure 13:
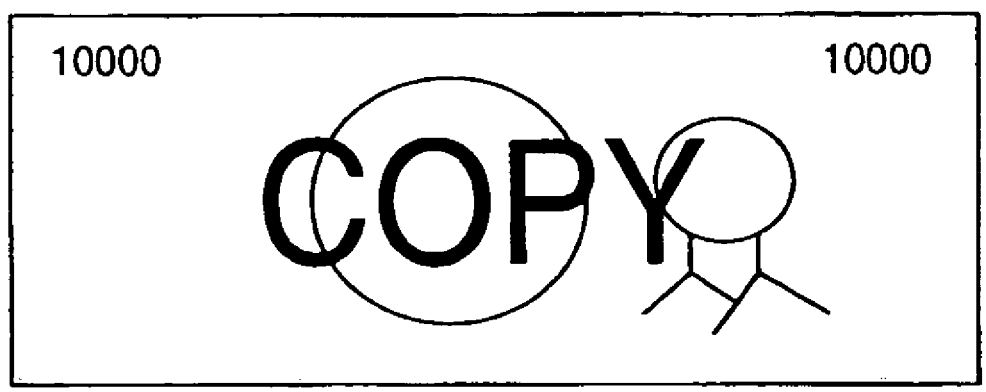
FIG. 13 is a view showing still another example of image processing in the information processing apparatus according to the third embodiment of the present invention.

FIGS. 11, 12, and 13 are views each showing an example of image processing in an image processing system according to the third embodiment of the present invention. In FIG. 11, part of an original image 11-1 is enlarged and represented in units of pixels to obtain an enlarged main part image 11-2. If pixels to be left in target image data 12-1 corresponding to the enlarged main part image 11-2 shown in FIG. 11 are designated with arrows, image processing of extracting only information of the pixels designated by the arrows is executed to generate image data 12-2 to be output. In the example shown in FIG. 12, the resolution is decreased by simply thinning information every other pixel. After the resolution is decreased, the image data is output as one reduced to ½ (50%) the image data before the resolution is decreased.

When image data before processing is made up of color signals of R (Red), G (Green), and B (Blue), and image data of each color signal is 8-bit data representing 256 gray levels from "0" to "255", the resolution is decreased by fixing lower 4 bits to 0 without changing upper 4 bits.

FIG. 13 is an image as a result of performing anti-forgery image processing for original data shown in FIG. 4A when another image is to be added to image data.

In the example shown in FIG. 13, image data of pixels corresponding to characters "COPY" are added to an original image. Note that only one color of R, G, and B, or M, C, Y, and BK may be left, and images of the remaining colors may be erased.

In this case, for, e.g., R, G, and B, image data of Red as one separated color is left without any processing, and data of all the pixels are changed to "255" for image data of the remaining Green and Blue colors.

According to the first to third embodiments, forgery operation can be suppressed by the scanner driver or printer driver, and thus the forgery suppression effect can be expected for all image inputs from scanners and image outputs to printers.

The configuration of a data processing program readable by the information processing apparatus according to the present invention will be explained with reference to a memory map shown in FIG. 14.

FIG. 14 is a view for explaining the memory map of a storage medium which stores various data processing programs readable by the information processing apparatus according to the present invention.

Although not shown, this storage medium sometimes stores information for managing programs stored in the storage medium, such as version information and programmer name, and information depending on the OS of the program reading side, such as an icon for discriminatively displaying a program.

Further, data subordinate to various programs are also managed by directory information. In some cases, the storage medium also stores a program for installing various programs in a computer, or a program for decompressing a program to be installed when the program is compressed.

The functions shown in FIGS. 3 and 8 may be achieved by the host computer 21 in accordance with an externally installed program. The present invention is also applied to a case wherein pieces of information including a program are supplied to an output apparatus from a storage medium such as a CD-ROM, flash memory, or FD, or from an external storage medium via a network.

In the first to third embodiments, the anti-forgery control module saves a copying-prohibited pattern as a template for image data (scanner driver) input by the scanner or rasterized image data (printer driver), and performs pattern matching to determine whether the image data matches a copying-prohibited image. This determination is not limited to pattern matching. When digital watermark information representing a copying-prohibited image is embedded in the copying-prohibited image, this digital watermark may be held by the anti-forgery control module, and detected from the (input or rasterized) image data to determine the presence of the copying-prohibited image.

Note that the digital watermark may be one which is embedded in a specific frequency in an image and cannot be recognized with a naked eye, or one which is embedded in a copying-prohibited image with an unnoticeable size and color and can be visually recognized. The digital watermark is preferably embedded in the pattern of a copying-prohibited image because the digital watermark cannot be visually recognized.

The digital watermark may contain, as code information, information about the type of copying-prohibited image, the issue country, the issue number, and the value. This information may be determined by the forgery determination module, and stored as log information as shown in FIG. 7. If the log information is stored in the folder of the HDD 108 by encrypting this information so as not to decrypt it without using a dedicated application, the log of processing the copying-prohibited image can be stored with high security.

When the copying-prohibited image is processed by the anti-forgery control module, the log information shown in FIG. 7 may be added as a digital watermark to a processed image. With this processing, even if an image is formed using a printer driver having no forgery determination module, the added digital watermark can be detected from the print by the scanner driver.

Fourth Embodiment

A case wherein an information processing apparatus reads an original by a scanner, and if information (digital watermark) which cannot be recognized with a naked eye is embedded in the read original, executes predetermined image processing will be explained as the fourth embodiment of the present invention.

The arrangements of an information processing apparatus, scanner, and printer in the fourth embodiment are the same as those shown in FIG. 1, and a description thereof will be omitted.

Figure 15:
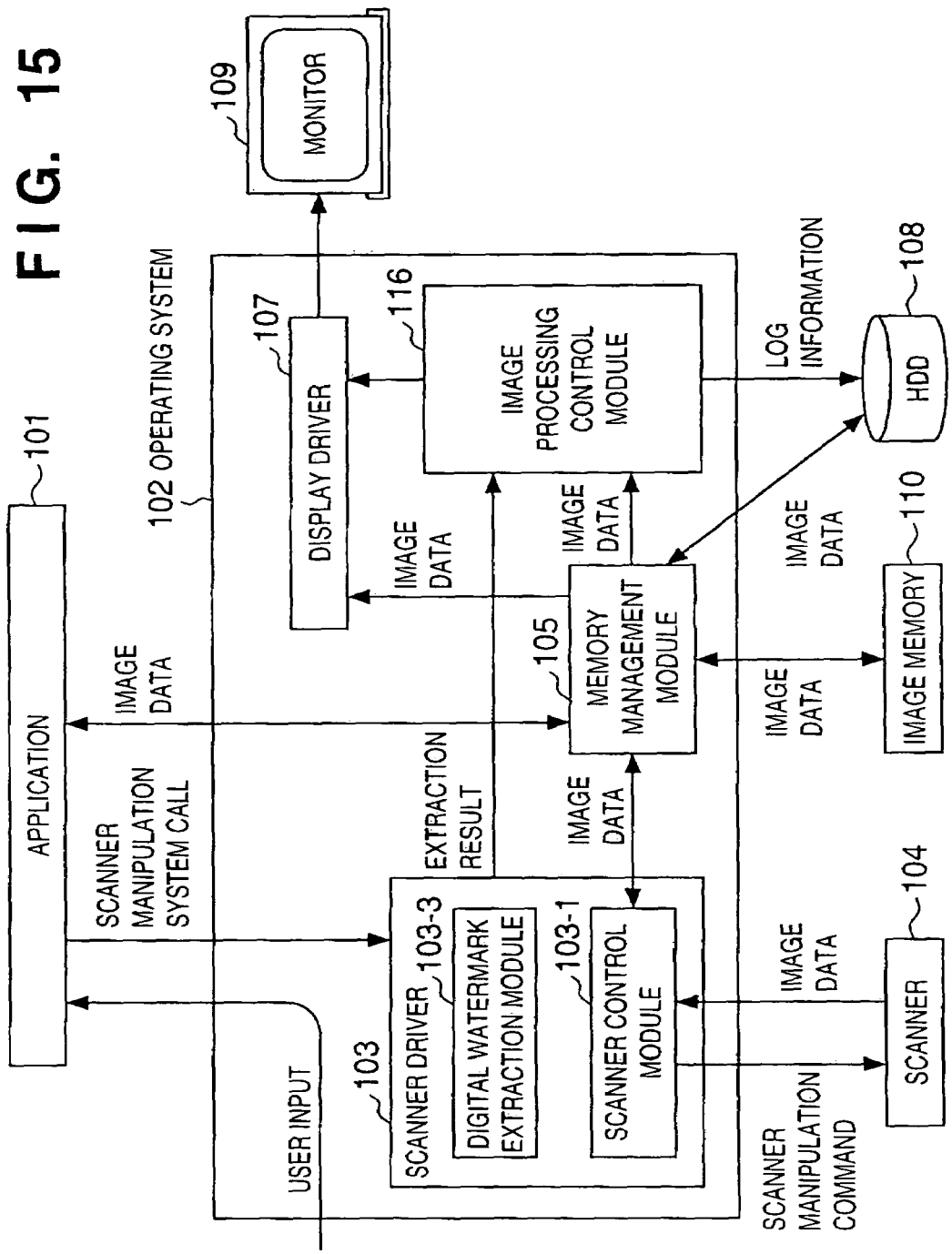
FIG. 15 is a block diagram showing the arrangement of an image processing system in the fourth embodiment.

FIG. 15 is a block diagram showing the arrangement of an image processing system in the fourth embodiment, and shows in detail the internal structure of the operating system (OS) of a host computer 21. Note that most of OSs such as UNIX isolatedly mount a device driver which interfaces with hardware such as a scanner, and various modules for performing management of other user applications, memory management, and the like. In this embodiment, an OS having this isolation structure will be exemplified.

As shown in FIG. 15, an OS 102 has a scanner driver 103 as a module for controlling a user input and another hardware device, and in addition controlling a scanner 104. The scanner driver 103 in the fourth embodiment comprises a scanner control module 103-1 for directly controlling the scanner 104 and a digital watermark extraction module 103-3 for extracting information (digital watermark) embedded in image data from the image data read by the scanner 104.

The OS 102 comprises an image processing control module 116 for executing image processing control processing (to be described in detail later) in accordance with the extraction result from the digital watermark extraction module 103-3, and a display driver 107 for displaying image data read by the scanner 104, a user interface window, or the like on a monitor 109.

Further, the OS 102 comprises a memory management module 105 for managing an image data area as an image memory 110 (part of a RAM 205).

A scanner manipulation application (application) 101 is made up of a GUI routine for interfacing with the user, a routine for interpreting a user input received via the OS 102 and issuing an instruction for operating the scanner 104, a routine for displaying image data read from the scanner 104, and a routine for saving read image data in an HDD 108.

The scanner 104 sends, to the host computer 21 in accordance with a predetermined interface rule, image data obtained by scanning an original placed on a table with a CCD line sensor (not shown) in accordance with a scanner manipulation command (signal) from the scanner driver 103, optically reading the original, and converting the image data into an electrical signal (photoelectric conversion).

The image signal is comprised of luminance signals of color components, e.g., R, G, and B, and each luminance signal is multilevel data of 8 to 12 bits.

An operation of reading an original by the scanner 104, and if information (digital watermark) which cannot be recognized with a naked eye is embedded in the read original, executing predetermined image processing will be explained.

Figure 16:
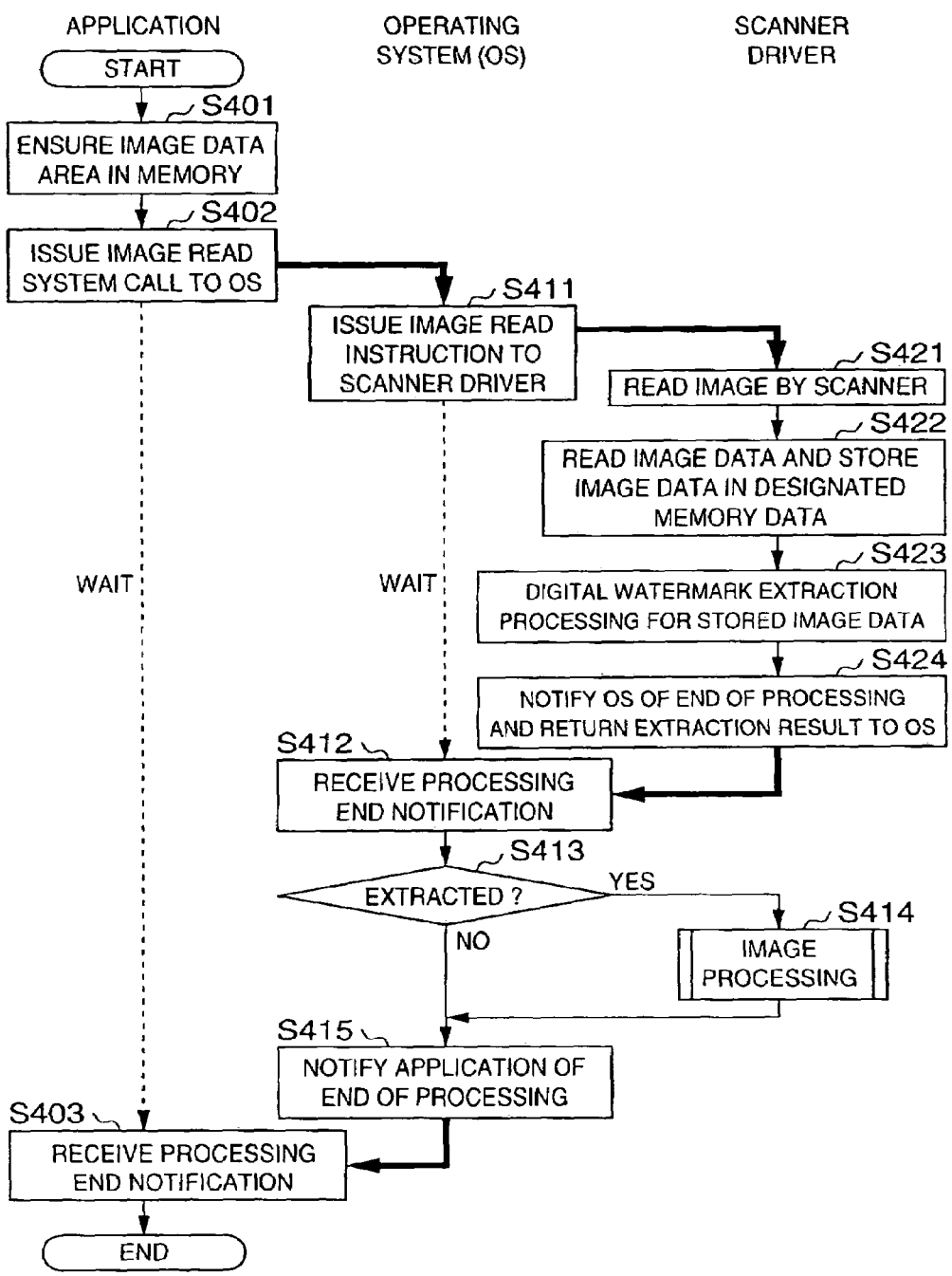
FIG. 16 is a flow chart showing the processing sequence of the system in the fourth embodiment.

FIG. 16 is a flow chart showing an example of the processing sequence of the system in the fourth embodiment. This processing corresponds to data processing between the modules of the application 101, OS 102, and scanner driver 103 shown in FIG. 15 S401 to S403 shown in FIG. 16 correspond to the steps of the application 101;

S411 to S415, to the steps of the operating system 102; and S421 to S424, to the steps of the scanner driver 103.

When the user instructs scanning start operation via the GUI of the application 101, the application 101 advances to step S401. Before read operation starts, the application 101 ensures in the image memory 110 (RAM 205) the area of an image to be read that is designated by the user. Note that the image area on the image memory 110 is ensured by the memory management module 105. In step S402, the application 101 specifies the scanner 104 to the OS 102, issues an image read instruction, and enters a wait state and stays there until the application 101 receives an image read processing end notification in step S403.

In step S411, the OS 102 which has received the scanning start instruction invokes the scanner control module 103-1 of the scanner driver 103 corresponding to the specified scanner (in the fourth embodiment, the scanner 104) to issue an image read instruction with the scanner 104. The OS 102 enters a wait state and stays there until processing of the scanner driver 103 ends. At this time, the OS 102 prepares a variable for information extracted from a digital watermark in image data output from the digital watermark extraction module 103-3.

In step S421, the scanner control module 103-1 in the scanner driver 103 that has received the scanning start instruction from the OS 102 issues a scanning start instruction unique to the scanner to the scanner 104 to read an image. In step S422, after image data of the original is read, the scanner control module 103-1 stores image data received from the scanner 104 in the ensured image data area of the application 101 in the image memory 110 (RAM 205), and shifts processing to the digital watermark extraction module 103-3.

Digital watermark extraction processing in the digital watermark extraction module 103-3 will be explained.

The digital watermark extraction module 103-3 divides the input image data into blocks, and performs Fourier transformation for each block to extract a frequency component. The digital watermark extraction module 103-3 separates image data of the obtained frequency area into an amplitude spectrum and phase spectrum, and detects a registration signal contained in the amplitude spectrum.

The registration signal is embedded by an impulse signal to a frequency of an intermediate level which is equal to or lower than the first frequency level at which the registration signal is hardly recognized by the human perception, and equal to or higher than the second frequency at which the registration signal is not removed by irreversible compression/decompression, in consideration of the drawbacks of a high-frequency component and low-frequency component that embedding of a signal in a low-frequency component is readily recognized as noise by the visual characteristic of the human, as compared to embedding of a signal in a high-frequency component, and that an irreversible compression method such as JPEG compression has a low-pass filter effect and the high-frequency component is removed by compression/decompression processing.

In registration detection, the digital watermark extraction module 103-3 extracts the impulse signal in the intermediate-level frequency range included in the amplitude spectrum. The digital watermark extraction module 103-3 calculates the scaling factor of digital image data from the coordinates of the extracted impulse signal. The digital watermark extraction module 103-3 detects in advance which frequency component of an image to be detected before scaling contains an impulse signal.

The digital watermark extraction module 103-3 can calculate the scaling factor from the ratio of the frequency detected in advance to the frequency at which the impulse is detected. Letting a be the frequency detected in advance, and b be the frequency at which the impulse is detected, scaling at a/b is performed. This is the property of known Fourier transformation.

The digital watermark extraction module 103-3 determines the size of a pattern for detecting a digital watermark contained in digital image data, and performs convolution using the pattern to detect the digital watermark contained in the digital image data.

Note that the digital watermark may be added to any component constituting digital image data. In general, however, the digital watermark is added to a blue component to which the human visual sense is most insensitive. In this case, the above-described pattern detection is done for a blue component.

When a digital watermark is not added to a visible color component constituting digital image data, but a digital watermark for embedding information in a specific frequency component is embedded in digital image data, processing may be done to detect the digital watermark for the specific frequency after the digital image data undergoes Fourier transformation.

The digital watermark may be one which is embedded in a specific frequency in an image and cannot be recognized with a naked eye, or one which is embedded in an image with an unnoticeable size and color and can be visually recognized. The digital watermark is preferably embedded in the pattern of an image because the digital watermark cannot be visually recognized.

The digital watermark may contain, as code information, information about the type of image, the issue country, the issue number, and the value. This information may also be determined by the digital watermark extraction module, and stored as log information as shown in FIG. 7. If the log information is stored in the folder of the HDD 108 by encrypting this information so as not to decrypt it without using a dedicated application, the log of processing the digital watermark-embedded image can be stored with high security.

When the digital watermark-embedded image is processed by the digital watermark extraction module, the log information shown in FIG. 7 may be added as a digital watermark to a processed image. With this processing, even if an image is formed using a printer driver having no digital watermark extraction module, the added digital watermark can be detected from the print by the scanner driver.

The fourth embodiment has described the digital watermark extraction module 103-3 as a software module. However, the digital watermark extraction module 103-3 can be realized by performing processing by hardware constituted by, e.g., a high-speed RISC and ASIC to increase the speed.

After the image data is read and subjected to digital watermark extraction processing, the scanner driver 103 notifies in step S424 the OS 102 of the end of read processing, and at the same time returns the result representing whether information can be extracted, and extracted information.

If the OS 102 receives the processing end notification from the scanner driver 103 in step S412, the OS 102 checks in step S413 whether a digital watermark is extracted. If the digital watermark is extracted, the OS 102 advances to step S414, and shifts to image processing (to be described in detail later).

If the digital watermark is not extracted in step S413, and image processing ends, the OS 102 issues a processing end notification to the application 101. When the application 101 receives the processing end notification in step S403, image read operation of the scanner system ends.

Details of image processing control processing (S414 shown in FIG. 16) performed by the image processing control module 116 will be described.

Figure 17:
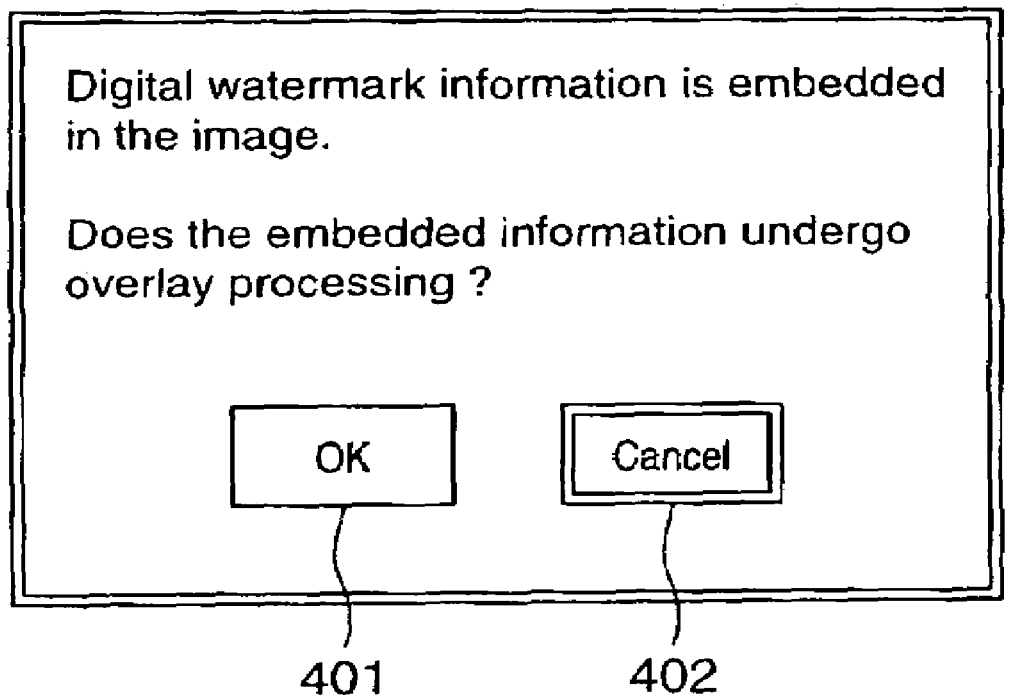
FIG. 17 is a view showing an example of a user interface window displayed on a monitor 109.

FIG. 17 is a view showing an example of a user interface window displayed on the monitor 109. This example shows a window displayed to the user when digital watermark information is recognized to exist in image data read by the scanner 104.

Figure 18A:
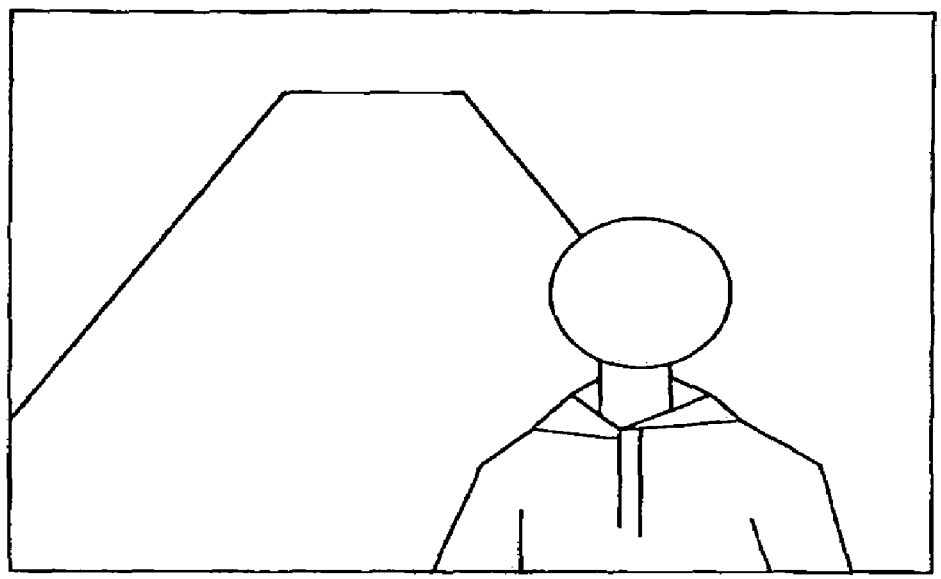
FIGS. 18A and 18B are views showing an example of image processing according to the fourth embodiment.
Figure 18B:
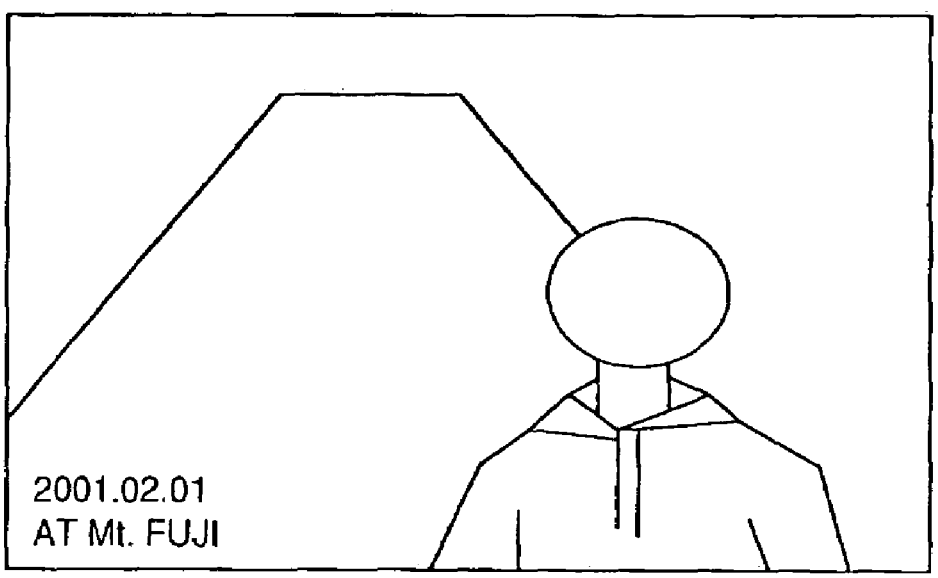

In FIG. 17, reference numeral 401 denotes a button which is selected and clicked by the user when the user approves the contents of a display and outputs extracted information by overlaying it on an image. FIGS. 18A and 18B show an example of the image output at this time. FIG. 18A is an original image read by the scanner 104, and FIG. 18B is a result of overlaying extracted information on FIG. 18A.

Reference numeral 402 in FIG. 17 denote a button which is selected by the user when the user approves the contents of a display and does not overlay the extracted information on the image output.

FIG. 19 is a view showing an example of log information stored in the hard disk 108. This example shows information extracted from a digital watermark.

Fifth Embodiment

The fourth embodiment has described a case wherein a digital watermark is extracted from an input image to execute predetermined image processing in a scanner system. The same processing can also be performed in a printer system. A system in the fifth embodiment will be explained.

The arrangement of the system in the fifth embodiment is the same as that shown in FIG. 1, and a description thereof will be omitted.

Figure 20:
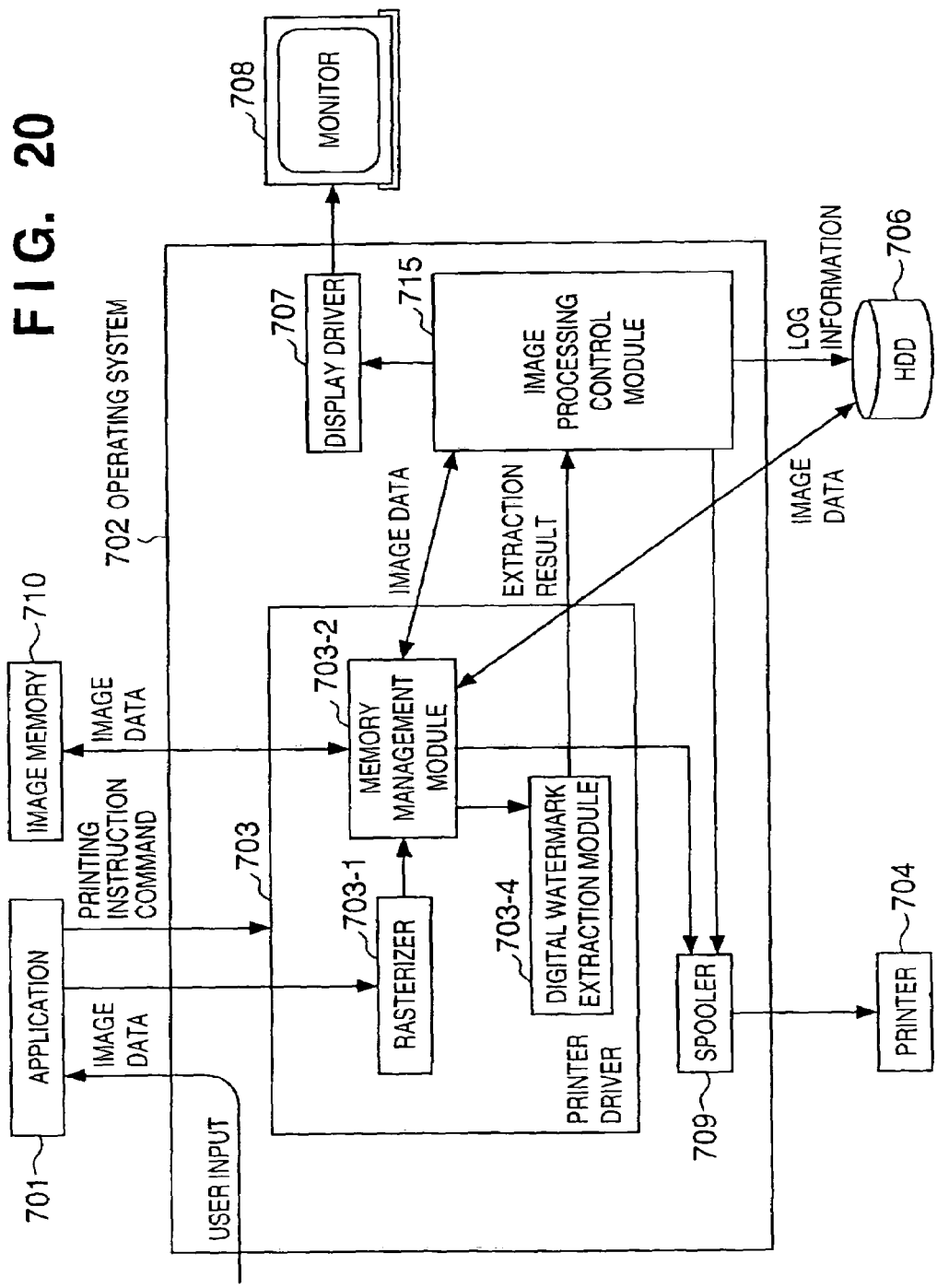
FIG. 20 is a block diagram showing the arrangement of an image processing system in the fifth embodiment.

FIG. 20 is a block diagram showing the arrangement of an image processing apparatus in the fifth embodiment. According to the fifth embodiment, image processing is done by a printer driver 703 and OS 702 in the image processing system built by a host computer 21 and printer. Similar to the fourth embodiment, the OS 702 runs on the host computer 21, and an application 701 running on the OS 702 provides a manipulation environment for image output operation to a printer 704.

Similar to the scanner system shown in FIG. 15, the printer system shown in FIG. 20 is also implemented on a hardware arrangement shown in FIG. 1. This system is built by the host computer 21 and printer 704. Both the OS 702 and application 701 on the host computer 21 realize image processing in the information processing apparatus by running by a CPU 204 a program loaded from an HDD 108 to a RAM 205.

As shown in FIG. 20, the OS 702 has the printer driver 703 as a module for controlling a user input and another hardware device, and in addition controlling the printer 704. The printer driver 703 in the fifth embodiment comprises a rasterizer 703-1 for generating image data suitable for the printer 704, a memory management module 703-2 for managing an image memory 710 for storing the generated image data, and a digital watermark extraction module 703-4 for extracting and processing information by a digital watermark in the rasterized image data.

The OS 702 comprises an image processing control module 715 for executing image processing control processing (to be described in detail later) for an extraction result from the digital watermark extraction module 703-4, and a display driver 707 for displaying an output document, user interface window, and the like on a monitor 708. The extraction result as an output from the digital watermark extraction module 703-4 is transferred to the image processing control module 715, which performs processing of an image in accordance with the extraction result.

The OS 702 has a printing spooler (spooler) 709 for performing control for outputting a rasterized image to the printer 704.

Note that the rasterizer 703-1, image memory 710, and digital watermark extraction module 703-4 are adopted as the printer driver 703 and operated by software processing, but may be operated on the printer 704 side. In this case, the result of digital watermark extraction done by the printer 704 is returned to the image processing control module 715.

An operation of extracting information embedded by a digital watermark in image data to be output from the host computer 21 to the printer 704, and executing image processing control processing will be described.

Figure 21:
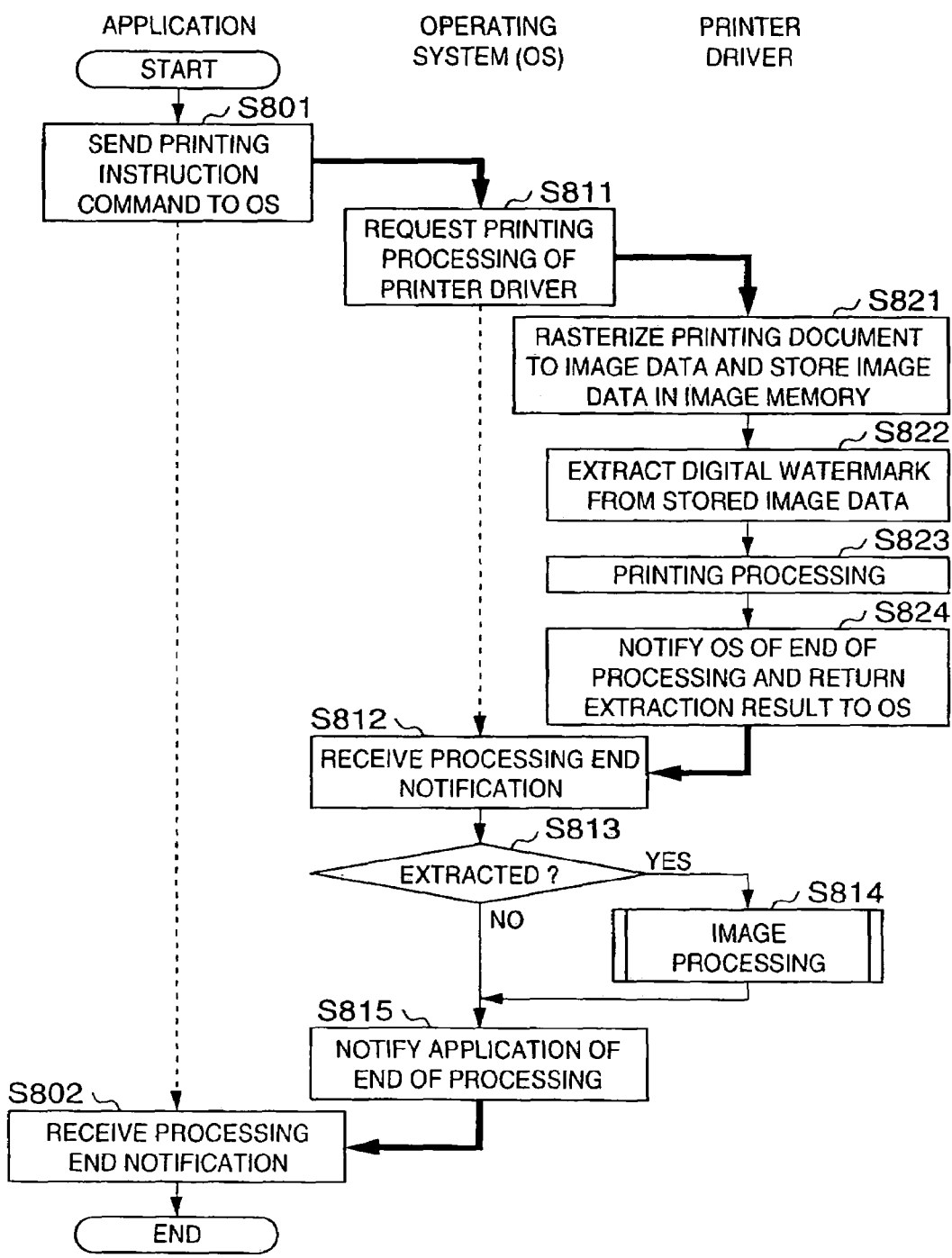
FIG. 21 is a flow chart showing the processing sequence of the system in the fifth embodiment.

FIG. 21 is a flow chart showing the processing sequence of the system in the fifth embodiment. This processing corresponds to data processing between the modules of the application 701, OS 102, and printer driver 703 shown in FIG. 20. S801 and S802 shown in FIG. 21 correspond to the steps of the application 701; S811 to S815, to the steps of the operating system 702; and S821 to S824, to the steps of the printer driver 703.

When the user designates a desired document and printer via the application 701 and instructs the start of printing processing, a printing instruction command is sent to the OS 702. Then, the application 701 enters a wait state and stays there until the application 701 receives a printing processing end notification in step S802.

In step S811, the OS 102 which has received the printing instruction command requests printing processing of a document received from the application 701, of the printer driver 703 corresponding to the designated printer (in the fifth embodiment, the printer 704), and enters a wait state and stays there until processing of the printer driver 703 ends. At this time, the OS 702 prepares a variable for information extracted from a digital watermark in image data output from the digital watermark extraction module 703-4.

The rasterizer 703-1 in the printer driver 703 which has received the printing processing request from the OS 702 rasterizes a printing document as image data, and stores the image data in the image memory 710. In step S822, the digital watermark extraction module 703-4 extracts information embedded by a digital watermark from the image data stored in the image memory 710.

At the same time when the image data is transferred to the digital watermark extraction module 703-4, it is also transferred to the spooler 709, and the printer 704 starts printing processing in step S823.

After extraction and printing processing of information embedded by the digital watermark in the image data end, the printer driver 703 notifies the OS 702 of the end of printing processing in step S824, and at the same time returns the digital watermark extraction result and extracted information.

The OS 702 receives the processing end notification of the printer driver 703 in step S812, and checks in step S813 whether a digital watermark is extracted. If the digital watermark is extracted, the OS 702 shifts to image processing in step S814, and executes the same processing as that in the fourth embodiment.

After this processing ends, the OS 702 outputs a processing end notification to the application 701. If the application 701 receives the processing end notification in step S802, printing processing of this system ends.

The configuration of a data processing program readable by the information processing apparatus according to the present invention will be explained with reference to a memory map shown in FIG. 22.

FIG. 22 is a view for explaining a memory map to a storage medium which stores various data processing programs readable by the information processing apparatus according to the present invention.

Although not shown, this storage medium may store information for managing modules stored in the storage medium, such as version information and programmer name, and information depending on the OS of the program reading side, such as an icon for discriminatively displaying a program.

Further, data subordinate to various programs are also managed by directory information. In some cases, the storage medium also stores a program for installing various programs in a computer, or a program for decompressing a program to be installed when the program is compressed.

The functions shown in FIGS. 16 and 21 may be achieved by the host computer in accordance with an externally installed program. The present invention is also applied to a case wherein pieces of information including a program is supplied to an output apparatus from a storage medium such as a CD-ROM, flash memory, or FD, or from an external storage medium via a network.

The objects of the present invention are also achieved by supplying a storage medium which records a program code of software that implements the functions of the above embodiments to a system or apparatus, and reading out and executing the program code stored in the storage medium by the computer (CPU or MPU) of the system or apparatus.

In this case, the program code read out from the storage medium implements the functions of the above embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like can be used.

The functions of the above embodiments may be implemented not only by executing the readout program code by the computer but also by performing some or all of actual processes by an OS (Operating System) running on the computer on the basis of an instruction of the program code.

Furthermore, the present invention also includes a case wherein the program code read out from the storage medium is written in the memory of a function expansion board inserted into the computer or a function expansion unit connected to the computer, the CPU or the like of the function expansion board or function expansion unit performs some or all of actual processes in accordance with the instruction of the program code, and the functions of the above embodiments are realized by this processing.

As has been described above, according to these embodiments, embedded information can be output as visible information by extracting the information embedded in the image, processing the extracted information into an image, and outputting the image.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus capable of controlling read operation of an original image by a scanner via a scanner driver, comprising:

determination means for comparing image data read by the scanner with specific image data representing a specific image to determine a matching degree;

inquiry means for inquiring of a user whether or not to output, via a user interface, when it is determined that the read image data substantially matches the specific image data by said determination means; and means for encrypting and storing log information including the type of specific image when an instruction to output is input via the user interface in response to the inquiry by said inquiry means.

2. The apparatus according to claim 1, further comprising process means for processing the read image data into image data different from the read image data when said determination means determines that the read image data substantially matches the specific image data.

3. The apparatus according to claim 2, further comprising storage means for storing image data read by the scanner, wherein said process means also processes the image data stored in said storage means.

4. The apparatus according to claim 1, wherein the specific image data is data of an original image whose copying operation is prohibited by law.

5. The apparatus according to claim 1, wherein the specific image data is stored and managed in advance so as to be updateable.

6. The apparatus according to claim 1, wherein the scanner can be connected via a local interface or a network interface.

7. The apparatus according to claim 1, wherein digital watermark information is embedded in the specific image data at a predetermined cycle.

8. The apparatus according to claim 7, wherein the digital watermark information includes, as code information, information about the type of specific image, an issue country, an issue number, and a value.

9. The apparatus according to claim 1, wherein the log information includes, as code information, information about the type of specific image, an issue country, an issue number, and a value.

10. An image processing method for an information processing apparatus capable of controlling read operation of an original image by a scanner via a scanner driver, comprising:

a determination step of comparing image data read by the scanner with specific image data representing a specific image to determine a matching degree;

an inquiry step of inquiring of a user whether or not to output, via a user interface, when it is determined that the read image data substantially matches the specific image data in the determination step; and a step of encrypting and storing log information including the type of specific image when an instruction to output is input via the user interface in response to the inquiry in said inquiry step.

11. The method according to claim 10, further comprising a process step of processing the read image data into image data different from the read image data when the image data is determined in the determination step to substantially match the specific image data.

12. The method according to claim 10, wherein the specific image data is data of an original image whose copying operation is prohibited by law.

13. The method according to claim 10, wherein the specific image data is stored and managed in advance so as to be updateable.

14. A computer-readable storage medium which stores a program for causing an information processing apparatus capable of controlling read operation of an original image by a scanner via a scanner driver, to execute:

a determination step of comparing image data read by the scanner;

an inquiry step of inquiring of a user whether or not to output, via a user interface, when it is determined that the read image data substantially matche the specific image data in the determination step; and a step of encrypting and storing log information including the type of specific image when an instruction to output is input via the user interface in response to the inquiry in said inquiry step.

15. The medium according to claim 14, further storing a program for causing the information processing apparatus to execute a process step of processing the read image data into image data different from the read image data when the image data is determined in the determination step to substantially match the specific image data.

* * * * *

UNITED STATES PATENT AND TRADEMARK OFFICE
CERTIFICATE OF CORRECTION

PATENT NO. : 6,930,803 B1
APPLICATION NO. : 09/712268
DATED : August 16, 2005
INVENTOR(S) : Takashi Suzuki Page 1 of 1

It is certified that error appears in the above-identified patent and that said Letters Patent is hereby corrected as shown below:

COLUMN 6:
Line 52, "printer 23;" should read -- printer 23, --.

COLUMN 8:
Line 23, "ule-103-2" should read -- ule 103-2 --; and
Line 58, "in" should read -- in detail --.

COLUMN 10:
Line 8, "treed," should read -- freed --.

COLUMN 11:
Line 11, "application 101" should read-- application 701 --.

COLUMN 17:
Line 21, "denote" should read -- denotes --.

COLUMN 22:
Line 1, "matche" should read -- matches --.

Signed and Sealed this

Nineteenth Day of December, 2006

JON W. DUDAS
*Director of the United States Patent and Trademark Office*